US010735438B2

(12) United States Patent
Addepalli et al.

(10) Patent No.: US 10,735,438 B2
(45) Date of Patent: Aug. 4, 2020

(54) SYSTEM, METHOD AND COMPUTER-ACCESSIBLE MEDIUM FOR NETWORK INTRUSION DETECTION

(71) Applicant: NEW YORK UNIVERSITY, New York, NY (US)

(72) Inventors: Sateesh K. Addepalli, San Jose, CA (US); Ramesh Karri, New York, NY (US); Vinayaka Jyothi, Ozone Park, NY (US)

(73) Assignee: New York University, New York, NY (US)

( * ) Notice: Subject to any disclaimer, the term of this patent is extended or adjusted under 35 U.S.C. 154(b) by 0 days.

(21) Appl. No.: 15/400,568

(22) Filed: Jan. 6, 2017

(65) Prior Publication Data
US 2017/0257388 A1    Sep. 7, 2017

Related U.S. Application Data

(60) Provisional application No. 62/275,501, filed on Jan. 6, 2016.

(51) Int. Cl.
*G06N 20/00* (2019.01)
*H04L 29/06* (2006.01)
*G06N 20/10* (2019.01)

(52) U.S. Cl.
CPC ......... *H04L 63/1416* (2013.01); *G06N 20/00* (2019.01); *G06N 20/10* (2019.01); *H04L 63/1458* (2013.01)

(58) Field of Classification Search
CPC .. G06N 99/005; G06N 20/00; H04L 63/1416; H04L 63/1458
See application file for complete search history.

(56) References Cited

U.S. PATENT DOCUMENTS

| 5,414,833 A * | 5/1995 | Hershey | H04L 63/145 |
| | | | 726/22 |
| 6,453,360 B1 * | 9/2002 | Muller | H04L 29/06 |
| | | | 370/235 |

(Continued)

FOREIGN PATENT DOCUMENTS

WO    WO-2013003751 A1 *    1/2013    ........... H04L 67/025

OTHER PUBLICATIONS

Zhong, Shi et al.,"Clustering-Based Network Intrusion Detection", International Journal of Reliability, Quality and Safety Engineering, vol. 14, No. 2 (2007) pp. 169-187. (Year: 2007).*

(Continued)

*Primary Examiner* — Michael Pyzocha
(74) *Attorney, Agent, or Firm* — Hunton Andrews Kurth LLP

(57) ABSTRACT

An exemplary system, method and computer-accessible medium for determining a starting point of a header field(s) in a network packet(s) can be provided, which can include, for example receiving the network(s) packet, determining a header location of the header field(s) in the network packet(s), determining a delimiter location of a delimiter(s) in the network packet(s), and determining the starting point of the header field(s) based on the header and delimiter locations. The header location can be determined using a header finder module. The delimiter location can be determined using a delimiter finder module. The header and delimiter locations can be determined using a plurality of comparators arranged into a plurality of sets.

14 Claims, 16 Drawing Sheets

(56) References Cited

U.S. PATENT DOCUMENTS

| | | | | |
|---|---|---|---|---|
| 6,791,947 | B2* | 9/2004 | Oskouy | H04L 12/56 |
| | | | | 370/238 |
| 7,234,168 | B2* | 6/2007 | Gupta | G06F 21/55 |
| | | | | 705/51 |
| 7,409,380 | B1* | 8/2008 | Mazzagatti | G06N 99/005 |
| 7,496,962 | B2* | 2/2009 | Roelker | H04L 63/0227 |
| | | | | 726/23 |
| 7,584,303 | B2* | 9/2009 | Ricciulli | H04L 47/2441 |
| | | | | 370/389 |
| 9,026,639 | B2* | 5/2015 | Kelley | H04L 43/16 |
| | | | | 709/224 |
| 9,210,090 | B1* | 12/2015 | Baldi | H04L 47/2441 |
| 9,258,217 | B2* | 2/2016 | Duffield | G06F 21/552 |
| 9,319,421 | B2* | 4/2016 | Ferragut | H04L 63/1408 |
| 9,800,608 | B2* | 10/2017 | Korsunsky | G06F 21/55 |
| 9,819,719 | B2* | 11/2017 | Hasson | H04L 69/22 |
| 2004/0193943 | A1* | 9/2004 | Angelino | H04L 63/1408 |
| | | | | 714/4.1 |
| 2005/0038827 | A1* | 2/2005 | Hooks | G06F 11/0748 |
| 2005/0078601 | A1* | 4/2005 | Moll | H04L 45/00 |
| | | | | 370/218 |
| 2005/0262556 | A1* | 11/2005 | Waisman | H04L 63/0236 |
| | | | | 726/22 |
| 2006/0206940 | A1* | 9/2006 | Strauss | G06F 21/55 |
| | | | | 726/23 |
| 2007/0110053 | A1* | 5/2007 | Soni | H04L 63/0263 |
| | | | | 370/389 |
| 2007/0130140 | A1* | 6/2007 | Cytron | G06F 16/90344 |
| 2008/0224902 | A1* | 9/2008 | Samuels | H03M 7/3084 |
| | | | | 341/51 |
| 2008/0285571 | A1* | 11/2008 | Arulambalam | H04L 29/06027 |
| | | | | 370/400 |
| 2009/0312983 | A1* | 12/2009 | Lee | G06F 11/3409 |
| | | | | 702/180 |
| 2010/0125900 | A1* | 5/2010 | Dennerline | H04L 63/1416 |
| | | | | 726/13 |
| 2010/0154057 | A1* | 6/2010 | Ko | H04L 63/1416 |
| | | | | 726/23 |
| 2011/0173490 | A1* | 7/2011 | Narayanaswamy | |
| | | | | H04L 63/1408 |
| | | | | 714/4.11 |
| 2011/0173588 | A1* | 7/2011 | Salapura | G06F 11/348 |
| | | | | 717/124 |
| 2011/0320617 | A1* | 12/2011 | Annamalaisami | |
| | | | | H04L 63/1458 |
| | | | | 709/228 |
| 2012/0114119 | A1* | 5/2012 | Ahuja | H04L 63/0853 |
| | | | | 380/44 |
| 2013/0097706 | A1* | 4/2013 | Titonis | G06F 21/56 |
| | | | | 726/24 |
| 2013/0185729 | A1* | 7/2013 | Vasic | G06F 9/5072 |
| | | | | 718/104 |
| 2014/0141788 | A1* | 5/2014 | Puthenpura | H04W 16/18 |
| | | | | 455/449 |
| 2015/0128262 | A1* | 5/2015 | Glew | G06F 21/554 |
| | | | | 726/23 |
| 2015/0207719 | A1* | 7/2015 | Chakhaiyar | H04L 49/356 |
| | | | | 370/252 |
| 2015/0378861 | A1* | 12/2015 | Deshpande | G06F 11/3409 |
| | | | | 717/131 |
| 2016/0197957 | A1* | 7/2016 | Lee | H04L 63/0263 |
| | | | | 726/1 |
| 2016/0306689 | A1* | 10/2016 | Jain | G06F 11/0742 |
| 2016/0328561 | A1* | 11/2016 | Tamir | G06F 21/552 |
| 2017/0032281 | A1* | 2/2017 | Hsu | B23K 9/0953 |
| 2017/0093669 | A1* | 3/2017 | Nortman | H04L 41/5035 |

OTHER PUBLICATIONS

Guan, Qiang et al., "Adaptive Anomaly Identification by Exploring Metric Subspace in Cloud Computing Infrastructures", 2013 IEEE 32nd International Symposium on Reliable Distributed Systems, pp. 205-214. (Year: 2013).*

Prolexic Attack Report, http://www.prolexic.com/knowledge-center-np-2013-ddos-attack-report-q2.html.

Arbor Networks, http://www.arbornetworks.com/corporate/blog/4922-q2-key-findings-from-atlas.

Ponemon Institute, http://security.radware.com/.

Windriver Whitepaper, http://www.windriver.com/whitepapers/deep-packet-inspection/Content_Inspection_Engine_WP.pdf.

Zhang, Kai et al., "Building High-Performance Application Protocol Parser on . . . ," IEEE International Conference on Parallel and Distributed Systems, pp. 188-195, 2011.

Velan, Petr et al., "Design and Evaluation of HTTP Protocol Parser for . . . ," Advances in Communication Networking, pp. 136-147, 2013.

Cavium, http://www.cavium.com/pdfFiles/CSS-DPI-White-Paper.pdf.

Abuhmed, Tamer et al., "A Survery on Deep Packet Inspection for Intrusion . . . ," arXiv preprint arXiv:0803.0037, pp. 1-10, Mar. 1, 2008.

Shiri, Farzane Izak et al., "A Survey on Parallel and Distributed Techniques for Improving . . . ," Australian J. of Basic and Applied Sciences, vol. 7, No. 6, pp. 267-273, 2013.

Ormazabal, Gaston et al., "Secure SIP: A Scalable Prevention Mechanism for DoS . . . ," IPTComm, LNCS 5310, pp. 107-132, 2008.

Meiners, Chad et al., "FlowSifter: A Counting Automata Approach to Layer 7 Field . . . ," IEEE Infocom, pp. 1746-1754, 2012.

Attig, Michael et al., "400 Gb/s Programmable Packet Parsing on a Single FPGA," ACM/IEEE, pp. 12-23, 2011.

Kozanitis, Christos et al., "Leaping Multiple Headers in a Single Bound: Wire-Speed . . . ," IEEE INFORCOM, pp. 1-9, 2010.

Kobierskly, Petr et al., "Packet Header Analysis and Field Extraction for Multigigabit . . . ," IEEE, pp. 96-101, 2009.

Pus, Viktor et al., "Low-Latency Modular Packet Header Parser for FPGA," ACM/IEEE, pp. 77-78, Oct. 29-30, 2012.

Moscola, James et al., "Implementation of Networks Application Layer Parser . . . ," IEEE, pp. 1-4, 2006.

Moscola, James et al., "Hardware-Accelerated Parser for Extraction of Metadata . . . ," IEEE, pp. 1-8, Jan. 7, 2007.

Bos, H. et al., "Towards Software-Based Signature Detection for Intrusion Prevention . . . ," Recent Advances in Intrusion Detection, pp. 102-123, 2006.

Cortes, Mauricio et al., "On SIP Performance," Bell Labs Technical Journal, vol. 9, No. 3, pp. 155-172, 2004.

Wanke, Stephan et al., "Measurement of the SIP Parsing Performance in the SIP Express Router," Dependable and Adaptable Networks and Services, pp. 103-110, 2007.

Nahum, Erich M. et al., "Evaluating SIP Proxy Server Performance," ACM SIGMETRICS, pp. 349-350, 2007.

Zou, Jia et al., "SIP Parsing Offload: Design and Performance," IEEE GLOBECOM, pp. 2774-2779, 2007.

Ehlert, Sven et al., "Survey of Networks Security Systems to Counter SIP-Based . . . ," Computers & Security, vol. 29, pp. 225-243, 2010.

Rehman, Ubaid Ur et al., "Securiryt Analysis of VoIP Architecture for Identifying . . . ," IEEE, pp. 87-93, 2014.

Yu, Fang et al., "Fast and Memory-Efficient Regular Expression Matching for Deep . . . ," ACM/IEEE, pp. 93-102, Dec. 3-5, 2006.

Wang, Hao et al., "A Modular NFA Architecture for Regular Expression Matching," ACM/SIGDA, pp. 209-218, Feb. 21-23, 2010.

Yang, Liu et al., "Improving NFA-Based Signature Matching Using Ordered Binary Decision . . . ," Recent Advances in Intrusion Detection, pp. 58-78, 2010.

IETF, "RFC 3261-SIP: Session Initiation Protocol," https:www.ietf.org/rfc/rfc3261.txt.

Hollenbeck, S. et al., "Guidelines for the Use of Extensible Markup Language (XML) . . . ," Networking Working Group, pp. 1-29, Jan. 2003.

R. Cover, "FIXML—A Markup Language for the FIX Application Message Layer," The XML Cover Pages, pp. 1-5, 1999.

(56) References Cited

OTHER PUBLICATIONS

Khalil, George, http://www.sans.org/reading-room/whitepapers/intrusion/open-sourceids-high-perfomance-shootout-35772.
PJSIP, http://www.pjsip.org/.
Stefanec, T. et al., "Grammer-Based SIP Parser Implementation with Performance Optimizations," IEEE, pp. 81-86, Jun. 15-17, 2011.
SIPp, http://sipp.sourceforge.net/.
Computer Weekly, http://www.computerweekly.com/news/4500247883/DDoS-attacks-starting-to-resemble-APTs-warns-Imperva.
Cisco, http://www.cisco.com/web/offer/gist ty2 asset/Cisco 2014 ASR.pdf.
Krebs on Security, http://krebsonsecurity.com/2013/02/ddos-attack-on-bank-hid-900000-cyberheist/.
Roesch, Martin "Snort:Lightweight Intrusion Detection for Networks," Lisa Sac, pp. 229-238, Nov. 7-12, 1999.
Galu, Vlad, http://www.packetdam.com/.
R-fx Neworks, http://www.rfxn.com/projects/advanced-policy-firewall/.
Imperva, https:///www.incapsula.com/blog/ddos-global-threat-landscape-report-q2-2015.html.
Bhuyan, Monowar H. et al., "Detecting Distributed Deniel of Service Attacks: Methods, . . . ," The Computer Journal, vol. 57, No. 4, pp. 1-20, Mar. 28, 2013.
Zargar, Saman Taghavi et al., "A Survey of Defense Mechanisms Against Distributed . . . ," IEEE, vol. 15, No. 4, pp. 2046-2069, 2013.
Geva, Moti et al., "Bandwidth Distributed Denial of Service: Attacks and Defenses," IEEE, pp. 54-61, 2013.
Gil, Thomer M. et al., "MULTOPS: A Data-Structure for Bandwidth Attack Detection," USENIX Security, pp. 1-12, 2001.
Ahmed, Abdulghani Ali et al., "Real-Time Detection of Intrusive Traffic in QoS . . . ," IEEE Computer and Reliability Societies, pp. 45-53, Nov./Dec. 2013.
Walfish, Michael et al., "DDoS Defense by Offense," ACM, vol. 28, No. 1, Article 3, pp. 303-314, Mar. 2010.
Liu, Huey-Ing et al., "Defending Systems Against Tilt DDoS Attacks," IEEE TSSA, pp. 22-27, 2011.
Tan, Xiaobin et al., "Hidden Semi-Markov Model for Anomaly Detection," Applied Mathematics and Computation, vol. 205, pp. 562-567, 2008.
Xie, Yi et al., "A Large-Scale Hidden Semi-Markov Model for Anomaly Detection . . . ," IEEE/ACM, vol. 17, No. 1, pp. 54-65, Feb. 2009.
Mirkovic, Jelena et al., "A Taxonomy of DDoS Attack and DDoS Defense Mechanisms," ACM SIGCOMM CCR, pp. 39-53, 2004.
Ranjan, S. et al., "DDoS-Resilient Scheduling to Counter Application Layer Attacks . . . ," IEEE INFOCOMM, pp. 1-13, 2006.
Shtern, Mark et al., "Towards Mitigation of Low and Slow Application DDoS Attacks," IEEE IC2E, pp. 604-609, 2014.
Estan, Cristian et al., "New Directions in Traffic Measurement and Accounting," SIGCOMM, pp. 1-14, Aug. 19-23, 2002.
Suricata, "Open Information Security Foundation," http://suricata-ids.org/.
Paxson, Vern "Bro: A System for Detecting Networks Instruders in Real-Time," Computer Networks, pp. 2435-2463, 1999.
Jyothi, Vinayaka et al., "Deep Packet Field Extraction Engine (DPFEEE): A Pre-Processor . . . ," IEEE ICCD, pp. 266-272, 2015.
SpiderLabs, http://blog.spiderlabs.com/2011/01/loic-ddos-analysis-and-detection.html.
Du, Jiaqing et al., "Performance Profiling of Virtual Machines," ACM SIGPLAN/SIGOPS VEE, pp. 3-14, 2011.
Rao, Jia et al., "Online Measurement of the Capacity of Multi-tier Websites Using . . . ," IEEE ICDCS, pp. 705-712, 2008.

Economou, Dimitris et al., "Full-System Power Analysis and Modeling for Server . . . ," pp. 1-7, 2006.
Lewis, Adam. et al., "Run-Time Energy Comsumption Estimation Based on Workload . . . ," HotPower, pp. 17-21, 2008.
Schmidt, Matthias et al., "Malware Detection and Kernel Rootkit Prevention . . . ," IEEE PDP, pp. 603-610, 2011.
Pedregosa, Fabian et al., "Scikit-Learn: Machine Learning in Python," Journal of Machine Learning Research, vol. 12, pp. 2825-2830, 2011.
Wikipedia, "Random Forest," https://en.wikipedia.org/wiki/Randomforest.
P. Guide, "Intel (R) 64 and IA-32 Architectures Software Developer's Manual," pp. 1-844, Jun. 2010.
Chang, Chih-Chung et al., "LIBSVM: A Library for Support Vector Machines," ACM TIST, pp. 1-27, 2011.
Gaddam, Shehar R. et al. "K-Means+ID3: A Novel Method for Supervised . . . ," IEEE Computer Society, vol. 19, No. 3, pp. 345-354, Mar. 2007.
Gao, Meng et al., "A Nework Instrusion Detection Method Based on Improved K-Means . . . ," Advanced Science and Technology Letters, vol. 53, pp. 429-433, 2014.
SpiderLabs, http://blog.spiderlabs.com/2012/01/hoic-ddos-analysis-and-detection.html.
Kato, Keisuke et al., "An Intelligent DDoS Attack Detection System Using Packet . . . ," IJICR, vol. 5, No. 3, pp. 464-471, Sep. 2014.
Devi Kiruthika, B.S. et al., "An Impact Analysis: Real Time DDoS Attack Detection . . . ," IEEE ICRTIT, pp. 1-7, 2014.
Ramamoorthi, A. et al., "Real Time Detection and Classification of DDoS Attacks . . . ," IEEE, pp. 91-96, Jun. 3-5, 2011.
Beyond Security, http://www.beyondsecurity.com/vaac-curacyfalsepositivenegative.html.
Cortes, Corinna et al., "Support-Vector Networks," Machine Learning, vol. 20, pp. 273-297, 1995.
Snort, http://manual.snort.org/node17.html.
Information Week, http://www.darkreading.com/attacks-breaches/from-github-to-great-cannon-a-mid-year-analysis-of-ddos-attacks/a/d-id/1320818.
Kneschke, J., "Lighttpd," http://www.lightpd.net/.
Engine, M., "Netflow Analyzer," https:///www.manageengine.com/products/netflow/.
Wang, Xueyang et al., "NumChecker: A System Approach for Kernel Rootkit . . . ," IEEE DAC, pp. 1-7, 2013.
Paxson, V. et al., "Flex: the fast lexical analyzer," [From the Internet] http://www.gnu.org/software/flex, 2012.
IETF, "RFC 2616—HTTP: Hypertext Transfer Protocol," [From the Internet] https://www.ietf.org/rfc/rfc2616.txt, Jun. 1999.
Johnson, S. et al., "FIX/FIXML Implementation," [From the Internet] https://www.fixprotocol.org/cgi-bin/rbox/We . . . , 2001.
IETF, "RFC 2543—SIP: Session Initiation Protocol," [From the Internet] https://www.ietf.org/rfc/rfc2543.txt, Mar. 1999.
United States Computer Emergency Readiness Team (US-CERT), "Understanding Denial-of-Service Attacks," [From the Internet] https://www.us-cert.gov/ncas/ tips/ST04-015.
Arbor Networks, "ATLAS Threat report," [From the Internet] http://www.arbornetworks.com/threats/, 2018.
Verisign, "Distributed Denial of Service: Finally Getting the Attention it Deserves," [From the Internet] https://www.verisigninc.com/enUS/forms/ddosattentionreport.xhtml, Feb. 2016.
"DDoS-Deflate," [From the Internet] http://deflate.medialayer.com/.
Muda, Z. et al., "A K-Means and Naive Bayes learning approach for better intrusion detection," JIT, pp. 648-655, 2011.
Knerr, S. et al., "Single-layer learning revisited: A procedurewise procedure for building and training a neural network," Neurocomputing, pp. 41-50, 1990.

\* cited by examiner

```
Session Initiation Protocol (407)
  Status-Line: SIP/2.0 407 authentication required
  Message Header
     Allow: UPDATE,REFER
     Call-ID: 85216695-42dcdb1d@192.168.1.2
  Contact: <sip:212.242.33.35:5060>
  CSeq: 1 INVITE
  From: "arik" <sip:voi18062@sip.cybercity.dk>;tag
  Proxy-Authenticate: Digest realm="sip.cybercity.
     Authentication Scheme: Digest
     realm="sip.cybercity.dk"
     nonce="1701b4767d49c41117c7b73a255a353"
     opaque="1701a1351f70795"
     stale=false
     algorithm=MD5
  Server: Cirpack/v4.38e (gw_sip)
  To: <sip:0097239287044@sip.cybercity.dk>;tag=00-
  Via: SIP/2.0/UDP 192.168.1.2:5060;received=80.23
     Content-Length: 0
```

SYSTEM, METHOD AND COMPUTER-ACCESSIBLE MEDIUM FOR NETWORK INTRUSION DETECTION

CROSS-REFERENCE TO RELATED APPLICATION(S)

This application relates to and claims priority from U.S. Patent Application No. 62/275,501 filed on Jan. 6, 2016, the entire disclosure of which is incorporated herein by reference.

FIELD OF THE DISCLOSURE

The present disclosure relates generally to network security, and more specifically, to exemplary embodiments of an exemplary system, method and computer-accessible medium for network intrusion detection.

BACKGROUND INFORMATION

Detecting and mitigating denial of service ("DoS")/distributed DoS ("DDoS") attacks can be a top priority for computer networks. Prolexic reported an average DoS/DDoS attack bandwidth of 5.2 Gbps, during 2011 Q4. (See, e.g., Reference 1). During the same period, Arbor Networks reported that 13% of DoS attacks were greater than 10 Gbps with 50% of them being application layer attacks. During Q3 2013, 46.5% of attacks were greater than 1 Gbps. Further the proportion of attacks in the 2-10 Gbps range more than doubled when compared to 2012 attacks. In the first half of 2013, the number of attacks over 20 Gbps was two times the attacks seen in 2012. (See, e.g., References 2 and 3). These attacks pose a major threat to computer networks. Poneman Institute LLC reports that the average cost of each minute of downtime was about $22,000 in 2012. (See, e.g., Reference 4). FIG. 1 shows a graph of the distribution of cost per downtime due to DoS attacks.

A DoS or DDoS attack can attempt to make an online service unavailable by overwhelming the service with a huge amount of network traffic from a single or multiple sources. (See, e.g., Reference 41). These attacks target a wide variety of important resources, from banks to government websites, and present a major challenge to computer networks. Arbor Networks observes more than 2000 DDoS attacks per day. (See, e.g., Reference 42). 33% of all the service downtime incidents can be attributed to DDoS attacks. (See, e.g., Reference 3). DoS and DDoS attacks are often considered as instruments to simply knock down online services. However, recent incidents show that these attacks are being consistently used to disguise other malicious attacks such as delivering malware, data-theft, wire fraud and even extortion for bitcoins. (See, e.g., References 44-46). In one case, a DDoS attack on a bank aided the concealment of a $900,000 cyberheist. (See, e.g., Reference 47).

Most host-based DDoS detection mechanisms employ rate-based filtering approaches, which set a threshold for a certain network parameter to detect and mitigate DDoS attacks. A generalized rate-based mechanism for DDoS defense system is shown in the diagram of FIG. 10. Widely used tools such as "DDoS-Deflate", "Snort" (see, e.g., Reference 48), "DDoS-Deflate" (see, e.g., Reference 49), "Packet Dam" (see, e.g., Reference 50), "Lighttpd" (see, e.g., Reference 51), "Netflow Analyzer" (see, e.g., Reference 52), and "ConFigure Server Firewall ("CSF")" (see, e.g., Reference 53) use this methodology for DDoS attack evaluation. The monitored parameter can be the number of concurrent connections, the number of open connection requests, page access or request rate, etc. If an internet protocol ("IP") address crosses the threshold set by the defense tools, it can be considered a "BAD IP", and banned/blacklisted by the Firewall. After a predefined duration of time, the "BAD IP" can be removed from the blacklist and it can be no longer considered a "BAD IP". The threshold used in most of these mechanisms can be a static number predefined by the user. This can make the detection vulnerable to threshold learning attacks. An attacker can learn the threshold and can craft the DDoS attack to send malicious traffic with a rate below the threshold to bypass the detection mechanism. Thus, these attacks can persistently affect the victim for several days and evade the detection. Security reports illustrate that the current DDoS attacks last from a few hours to more than five days. (See, e.g., Reference 54).

Thus, it may be beneficial to provide an exemplary system, method and computer-accessible medium for network intrusion detection which can overcome at least some of the deficiencies described herein above.

SUMMARY OF EXEMPLARY EMBODIMENTS

An exemplary system, method and computer-accessible medium for determining a starting point of a header field(s) in a network packet(s) can be provided, which can include, for example receiving the network(s) packet, determining a header location of the header field(s) in the network packet(s), determining a delimiter location of a delimiter(s) in the network packet(s), and determining the starting point of the header field(s) based on the header and delimiter locations. The header location can be determined using a header finder module. The delimiter location can be determined using a delimiter finder module. The header and delimiter locations can be determined using a plurality of comparators arranged into a plurality of sets.

In some exemplary embodiments of the present disclosure, a plurality of field values of an application layer in the network packet(S) can be extracted from header field(s). The field values can be extracted using a plurality of finite state machines. Different segments of the network packet(s) can be accessed with the finite state machines simultaneously. A presence of protocol(s) of interest in the network packet(s) can be determined, which can be performed prior to determining the starting point of the header(s). The protocol(s) can be a session initiated protocol. The header field(s) can include a plurality of header fields, and the starting point of each of the header fields can be determined in parallel or simultaneously. The network packet(s) can be stored in a buffer or a computer storage arrangement.

A further exemplary embodiment of an exemplary system, method and computer-accessible medium for detecting an intrusion(s) in a network(s) can be provided, which can include, for example, receiving a plurality of Hardware Performance Counter ("HPC") values for an event(s), assembling the HPC values into a feature vector(s), clustering the HPC values of the feature vector(s), and detecting the intrusion(s) in the network(s) by determining a presence of anomaly(ies) based on the clustered HPC values. The HPC values can include values from of a hardware layer, a network layer or an application layer.

In some exemplary embodiments of the present disclosure, the clustering can include a k-means clustering, where the k-means clustering can include an unsupervised k-means clustering. The feature vector(s) can be clustered using a learning clustering procedure or an online clustering procedure. The learning clustering procedure can include a continuous learning, and can be used to determine a centroid value(s) of a cluster(s) in the feature vector(s). The online clustering procedure can exclude learning clustering.

In certain exemplary embodiments of the present disclosure, cluster membership in the feature vector(s) can be determined using the online clustering procedure. The presence of the anomaly(ies) can be determined) using a support vector machine. Access, by an internet protocol (IP) address(es) to network(s), can be denied based on the detection of the intrusion(s). Access to the IP address(es) can be granted after a predetermined amount of time has passed since the detection of the intrusion(s).

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which:

FIG. 6 is an exemplary image capture of a Wireshark capture of a SIP packet according to an exemplary embodiment of the present disclosure;

FIGS. 8A and 8B are images of exemplary experimental results of a Wireshark capture of Packet Under Test (e.g., FIG. 8A) and the exemplary system, method and computer-accessible medium extracted field's output of packet under test (e.g., FIG. 8B) according to an exemplary embodiment of the present disclosure;

Figure 1:
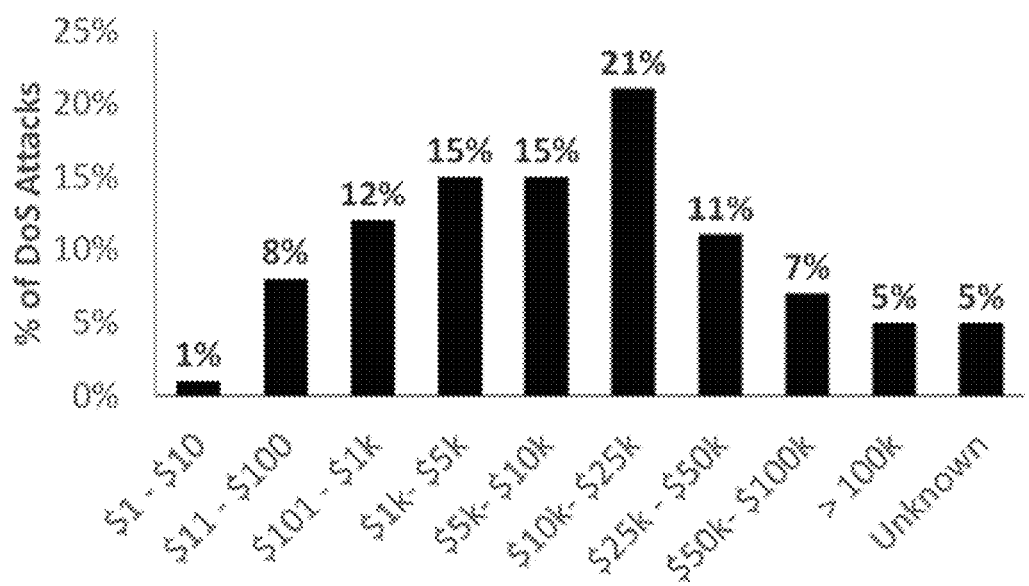
FIG. 1 is an exemplary chart illustrating cost per minute of downtime due to a DoS attack.

Throughout the drawings, the same reference numerals and characters, unless otherwise stated, are used to denote like features, elements, components or portions of the illustrated embodiments. Moreover, while the present disclosure will now be described in detail with reference to the figures, it is done so in connection with the illustrative embodiments and is not limited by the particular embodiments illustrated in the figures and the appended claims.

DETAILED DESCRIPTION OF EXEMPLARY EMBODIMENTS

Deep Packet Field Extraction Engine

Figure 2:
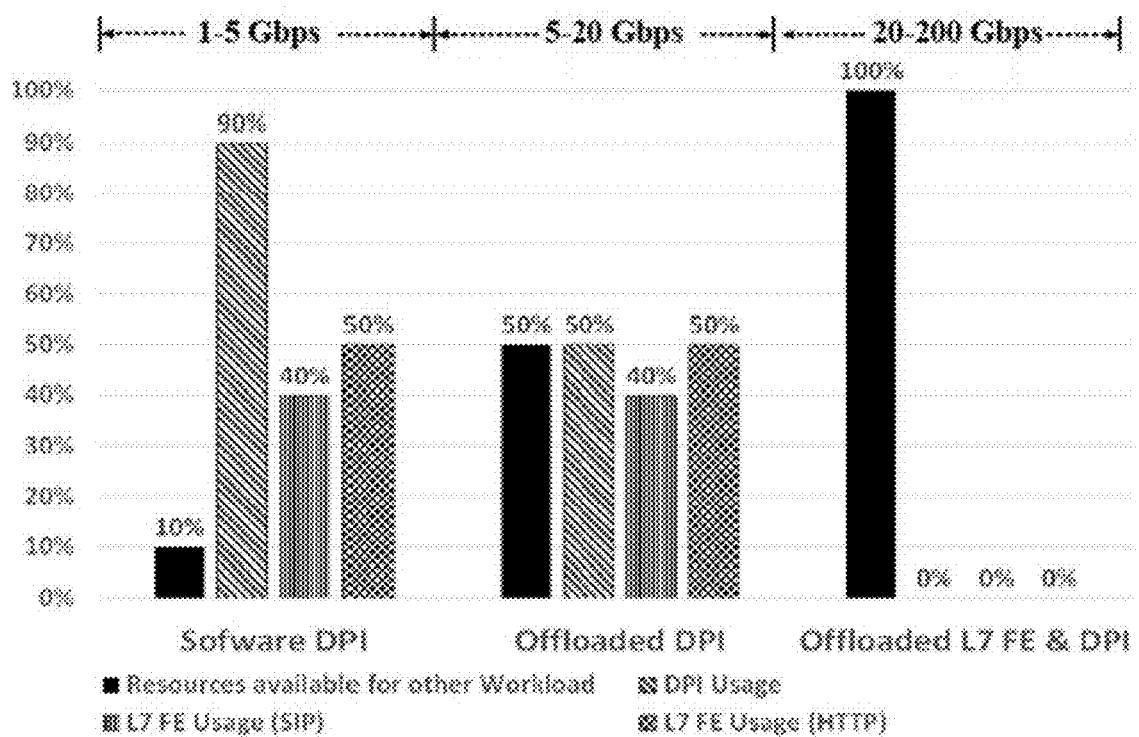
FIG. 2 is an exemplary chart illustrating resource utilization of DPI and L7 field extraction according to an exemplary embodiment of the present disclosure.
Figure 3A:
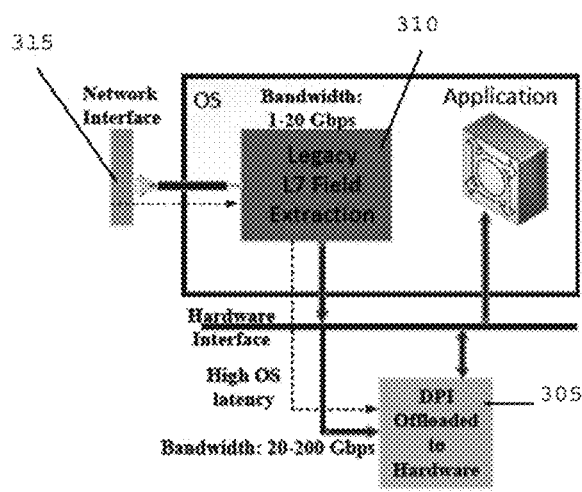
FIGS. 3A and 3B are exemplary diagrams providing a comparison of state-of-the-art DPI implementations (e.g., FIG. 3A) with the exemplary system, method and computer-accessible medium (e.g., FIG. 3B) according to an exemplary embodiment of the present disclosure.
Figure 3B:
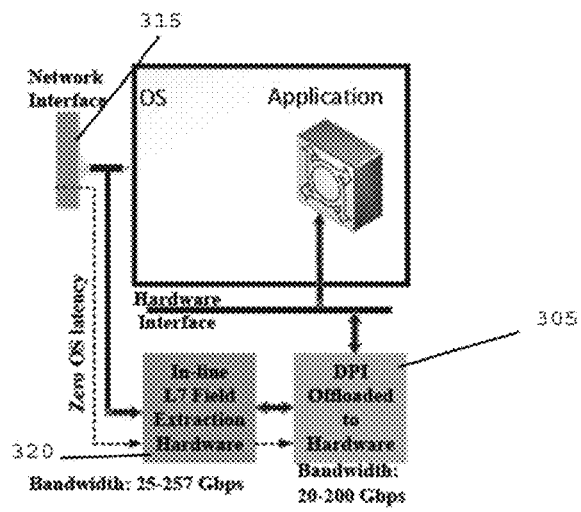

Deep Packet Inspection ("DPI") inspects packet headers (e.g., Layer 2 (L2)-Layer 4 (L4)) along with application data (e.g., Layer 5 (L5)-Layer 7 (L7)) to detect and mitigate malicious network attacks. If the resources of a system can be depleted by the security components themselves, these systems can be easily compromised by even less powerful DoS campaigns. FIG. 2 shows an exemplary graph, and FIGS. 3A and 3B illustrate diagrams, which illustrate the benefits of offloading L7 field extraction.

The exemplary Deep Packet Field Extraction Engine ("DPFEE") can ensure that the system resources may not be exhausted during L7 field extraction by communicating directly with network interface without forking into the operating system ("OS").

DPFEE can eliminate the latency due to memory accesses by bypassing the OS, this inherently facilitates the exemplary DPFEE to operate at wire-speed.

From a security point-of-view, the exemplary DPFEE can indirectly improve the performance of security systems that use it. High bandwidth of the exemplary DPFEE can ensure that the DPIs can work at their maximum bandwidth.

The service time for attack-free traffic can be improved due to reduction in total path latency between network interface and the application.

When DPI is added into a network system, the network system can operate at only one tenth of its rated performance. (See, e.g., Reference 5). Although DPI offloading, (see, e.g., References 9 and 10), relaxes the resource exhaustion in the network system, it does not eliminate the resource exhaustion completely as shown in the graph of FIG. 2.

In the case of Session Initiation Protocol ("SIP"), approximately 40% of total SIP processing power (e.g., CPU load, CPU time and memory consumption) can be consumed just for field extraction. (See, e.g., Reference 6). Similarly, L7 field extraction for the hypertext transport protocol ("HTTP") can degrade the performance of the system by 50-70%. (See, e.g., Reference 7). This can be because these systems depend on software based field extractors to obtain the utilized fields. Therefore, reducing the load of L7 field extraction on the systems can be critical. There has been a great amount of research in offloading and accelerating DPI on hardware to improve performance. (See, e.g., References 9 and 10). However, a limited amount of work exists on offloading and extracting L7 field extraction.

DoS detection procedures for specific protocols and applications employ filter-based procedures to inspect L7 header fields. (See, e.g., Reference 11). Although, these Anti-DoS ("ADS") procedures can operate at 10 Gbps bandwidth, their performance can be limited by software-based field extraction. Recent work on L7 field extraction operates at a maximum bandwidth of about 2 Gbps. (See, e.g., Reference 12). For an ADS to detect DoS attacks in real-time, a system that can extract application layer headers with low latency, and can operate at higher bandwidth, can be beneficial. However, state-of-the-art hardware architectures that can parse and extract fields at the application layer do not scale beyond about 20 Gbps. (See, e.g., Reference 6).

FIGS. 3A and 3B show exemplary diagrams of a comparison of state-of-the-art DPI implementations (see, e.g., FIG. 3A) with the exemplary system, method and computer-accessible medium (see, e.g., FIG. 3B) according to an exemplary embodiment of the present disclosure. For example, offloaded DPIs 305 can operate at higher bandwidths, but legacy L7 field extraction procedures 310 can have low bandwidth. (See, e.g., FIG. 3A). A 40 Gbps offloaded-DPI engine can be limited by a 2 Gbps L7 field extractors. For the exemplary DPFEE, operating at 250 Gbps and beyond, facilitates the network interface 315 bandwidth to scale beyond 250 Gbps without any bottleneck (e.g., using an in-line L7 Field Extraction Hardware 320). (See, e.g., FIG. 3B).

Network security and FPGA-based architectures for NIDS can assume that initial parsing has been performed, and the utilized fields can be extracted. (See, e.g., Reference 13). However, software based parsing and field extraction can but be slow. Software based parsing can run about 84% faster than prior procedures, and attain a maximum bandwidth of just about 2 Gbps. (See, e.g., Reference 12). Hardware based parsers have been designed that can parse network packets at about 400 Gbps (see, e.g., Reference 13), and can analyze packet headers at 40 Gbps, (see, e.g., Reference 14), and extract header fields at 20 Gbps. (See, e.g., Reference 15). FPGA implementation have been examined that can parse packet headers with a bandwidth of about 100 Gbps. (See, e.g., Reference 16). Application layer payload parsers have been presented in, (see, e.g., References 17 and 18), but have a maximum bandwidth of only about 3.2 Gbps.

Performance of software-based parsers can be improved by using a multi-core architectures, processor SOCs on FPGA and Network processors (e.g., Intel IXP series). (See, e.g., References 6, 8 and 19). A parallel application layer protocol parser running on multi-core platform can achieve a maximum bandwidth of about 20 Gbps for HTTP and about 5 Gbps for FIX protocol. (See, e.g., Reference 6). Parsing can be time and resource consuming for the SIP protocol. (See, e.g., References 20-22). Average SIP parsing can consume about 40% of total SIP processing time. (See, e.g., Reference 6). Even a SIP offload engine (see, e.g., Reference 23), reports that parsing consumes about 24% of total SIP processing time.

DoS attacks on SIP have been examined, which identified several types of attacks. (See, e.g., References 11, 24 and 25):

Flooding attacks target system resources, such as CPU, memory and link capacity to render SIP infrastructures inoperable.

Figure 4:
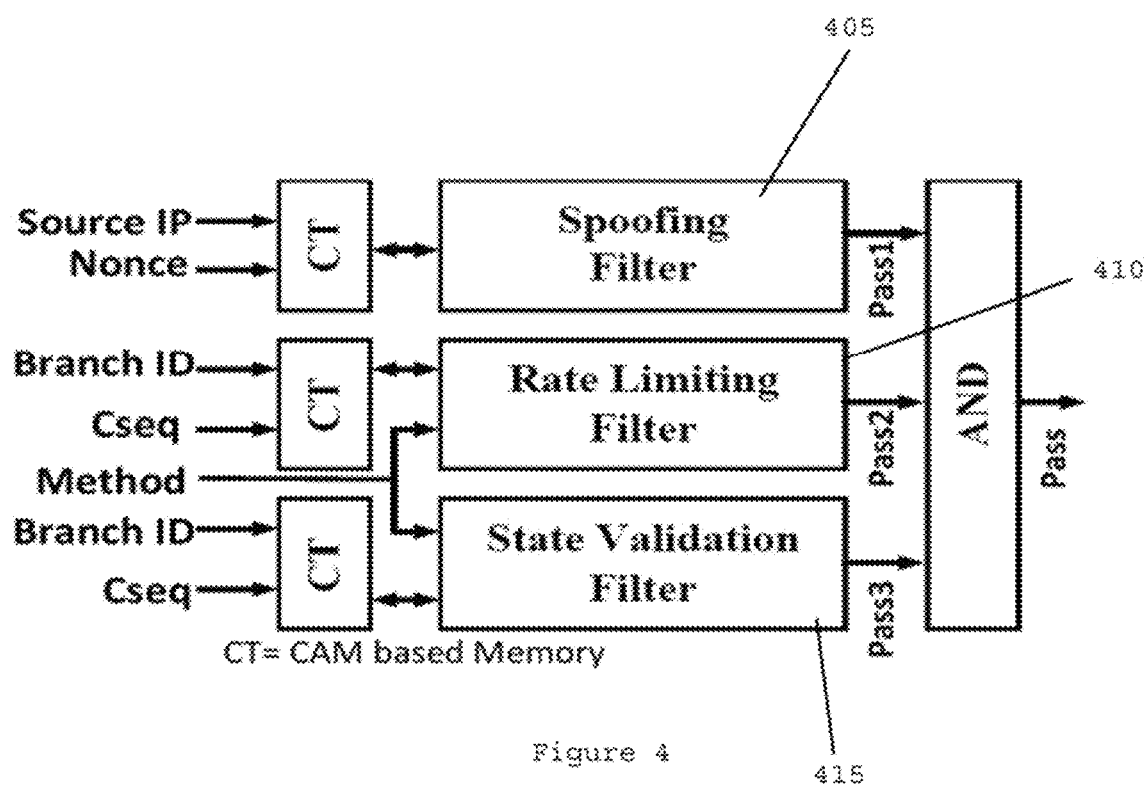
FIG. 4 is an exemplary diagram of an exemplary SIP DoS detection engine according to an exemplary embodiment of the present disclosure.

Tampering attacks use modified SIP messages to gain unauthorized access, eavesdrop or disrupt communication between legitimate users. Tampering can include:

i. Registration hijacking where a legitimate user's information can be sniffed and spoofed by an attacker to gain access to VoIP services.
  ii. Session hijacking where a session in progress can be taken over by an attacker by sniffing and replaying the message with attackers' destination address.
  iii. Detecting and mitigating DoS attacks on SIP protocol cannot be achieved by signature matching alone. It utilizes evaluation of application layer header fields by filters in real-time as shown in the diagram of FIG. 4. This can provide an incentive to create a high performance application layer field extractor. The exemplary system, method and computer-accessible medium, according to an exemplary embodiment of the present disclosure, can utilize a low latency and high bandwidth system that can extract the utilized application layer fields from real-time network traffic. The exemplary system, method and computer-accessible medium, according to an exemplary embodiment of the present disclosure, can be a pre-processor for ADS/NIDS/DPI to ensure that these systems work at their maximum bandwidth.

For example, FIG. 4 shows an overview of an exemplary SIP DoS detection engine. Such exemplary configuration/system can use Content Addressed Memory ("CAM") to store and evaluate real-time traffic for DoS attacks on SIP. For every SIP packet, it utilizes Source IP, nonce, Branch ID, Cseq and Method fields extracted from application layer. The packet of interest is facilitated to pass through, only if all the 3 filters (e.g., Spoofing filter 405, Rate Limiting Filter 410 and State Validation Filter 415) do not detect any DoS attack. This exemplary system can obtain carrier class performance, however the fields can be extracted in low performance software parser, which can limit the performance. The exemplary DPFEE can act as pre-processing engine to such anti-DoS systems.

Application layer field extraction can have low bandwidth for two reasons: (i) Header fields can be present anywhere in the application layer of a packet, and (ii) the field values inside a header can be present at varying offsets.

Until recently, parsers have been designed to be sequential due to these factors, and to use Deterministic Finite Automata ("DFA"), (see, e.g., References 26 and 27), or Non deterministic Finite Automata ("NFA"), (see, e.g., References 28 and 29), based on protocol grammar. This can increase the number of buffered packets; ultimately leading to dropping of incoming packets and causing a system to crash. In one exemplary experiment, Snort's SIP parser, (see, e.g., Reference 30), was subjected to packet rates of about 65800 and about 10000 packets per second ("PPS"). It achieved a bandwidth of about 892.71 Mbps and about 357 Mbps, respectively. An increase of about 34% in packets per second caused a performance degradation of about 60%.

During DoS attacks, the packet rate can reach a much greater magnitude when compared to the values in the exemplary experiment.

An exemplary limiting factor of prior systems can be addressed in the exemplary DPFEE by finding protocol specific header delimiters like Carriage Return Line Feed ("CRLF") in parallel with finding the header names. In the exemplary DPFEE, the time complexity of finding the starting location of the header field in a packet can be amortized to O(4) cycles. For streaming packets, this architecture can operate at wire-speed. Once the header start position can be found, the field value can be extracted sequentially from this location. Extracting all the field values in parallel can address a second limitation. A second exemplary limitation can be alleviated further by evaluating multiple bytes of data per cycle, and skipping non-essential packet data. In such a manner, the search space can be reduced from the length of the packet to the length of the header field. Due to the reduced extraction time, buffered packets can be processed at a faster rate.

Exemplary DPFEE Architecture

Figure 5:
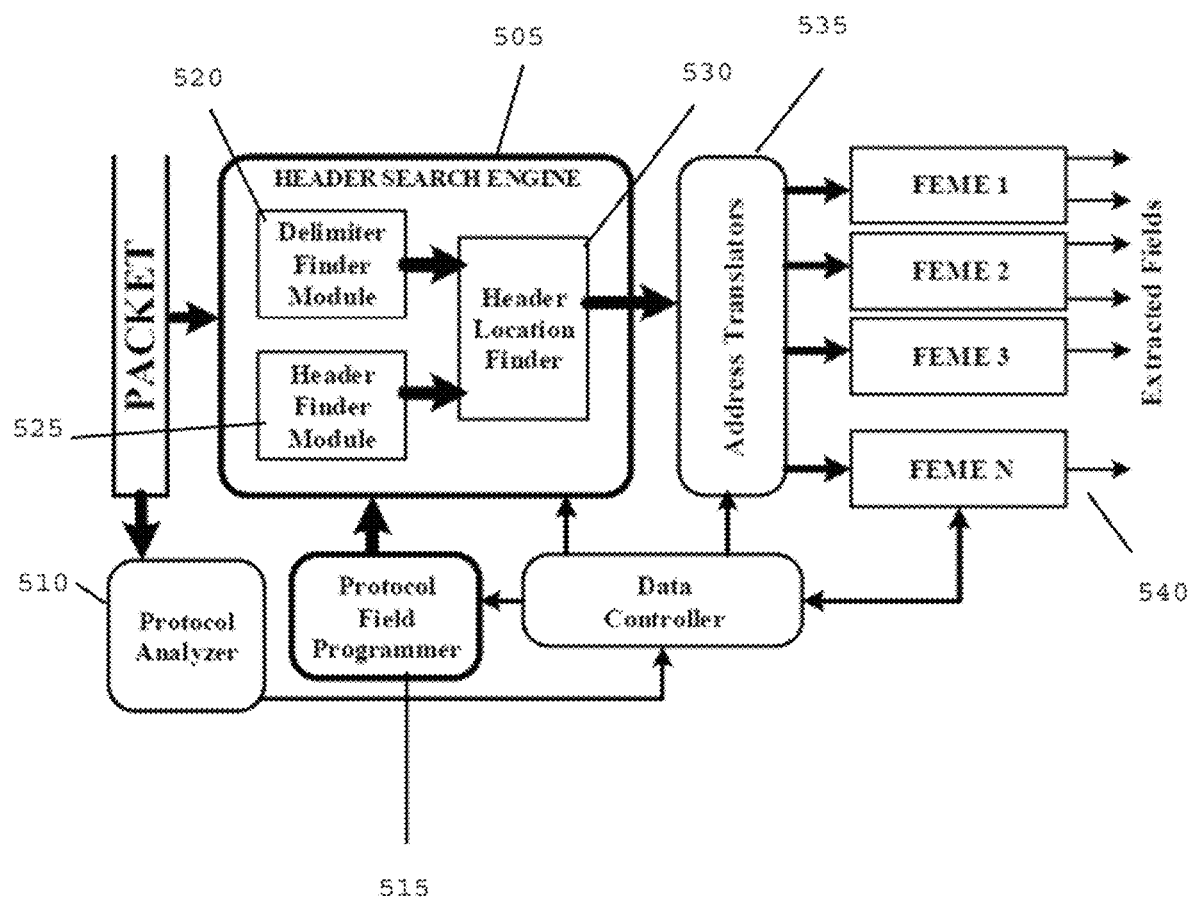
FIG. 5 is an exemplary diagram of an exemplary architecture of the exemplary system, method and computer-accessible medium according to an exemplary embodiment of the present disclosure.

The exemplary system, method and computer-accessible medium, according to an exemplary embodiment of the present disclosure, can utilize high performance architecture to extract multiple fields in parallel for any text based protocols (e.g., the DPFEE). The architecture of the exemplary DPFEE is shown in the diagram of FIG. 5. For example, header Search Engine ("HSE") 505 can be configured based on the observation that any header field of an application layer can be present after a delimiter specified by Internet Engineering Task Force ("IETF") Request for Comments ("RFC"): CRLF for SIP and HTTP, (see, e.g., References 31 and 32); ASCII value 00 01 or a sequence of characters—using the characters "<", "=", "&", etc. for XML based protocols, (see, e.g., Reference 33); and ASCII value 01 for Financial Information eXchange ("FIX"). (See, e.g., References 34 and 35). If the delimiter and a header field of interest are searched in parallel, and correlated, a unique match can exist, yielding the starting location of the header field of interest. This can facilitate the leverage of commonality in structure of packets of different text-based protocols to be searched in parallel. HSE can utilize multiple comparators arranged in sets to search header fields. HSE can locate the exact location of the header field in a packet of about 1500 bytes in just 4 cycles. Once this can be found, multiple FSM engines can be deployed in parallel to extract different field values.

The exemplary Protocol Analyzer 510 can check whether the packet contains the protocol of interest. The exemplary Protocol Field Programmer ("PFP") 515 can store the utilized header field's name and delimiter syntax, which can be used for supporting multiple protocols during run time, by reusing the same DPFEE. HSE 505 can be used to determine the location of the header fields of interest in a packet. HSE 505 can include comparators arranged in sets as described below. The exemplary Delimiter Finder Module ("DFM") 520 can find the locations where the delimiter can be present in the application layer data. The Header Finder Module ("HFM") 525 can find the presence of the utilized header name in the application layer data. The exemplary Header Location Finder ("HLF") 530 can correlate the outputs from the DFM 520 and the HFM 525 to determine the exact location of the header field. The exemplary Address Translators 535 can be used for sequential extraction from the starting location of a header; it can be beneficial to have the location expressed in terms of byte number. HSE output can be converted into byte number by exemplary Address Translators 535.

The Field Extraction Micro Engine ("FEME") 540 can be the FSMs that can extract field values within the header data of the application layer. Each FEME can access different segments of a packet at the same time.

Exemplary DPFEE for the Session Initiation Protocol

SIP is a text-based signaling protocol used for controlling multimedia communication sessions such as Voice over Internet Protocol ("VoIP") and other text and multimedia sessions. (See, e.g., Reference 31). SIP can be used to create, modify and terminate sessions between one or more participants.

An exemplary illustration of a Wireshark capture of SIP packets is illustrated in FIG. 6. To detect DoS attacks on a SIP protocol the following can be used: source IP, branch ID, call ID, sequence number, method and nonce field values need to be extracted from application layer. (See, e.g., Reference 11). Source IP and branch ID can be present in the "Via" header. Sequence number and method can be present in "CSeq" header. Nonce and call id can be present in "Proxy-Authentication" and "Call-ID" headers, respectively. "Via", "CSeq", "Proxy-Authentication" and "Call-ID" can be the Header Fields, whereas the values for source IP, branch ID, sequence number, method, nonce and call id can be the Field Values. Various exemplary implementations can use different name syntax for the same header field. For example, the VoIP company Call Centric, uses "v:" instead of "Via". (See, e.g., Reference 36). Thus, the field extraction engine needs to be flexible to handle different header name syntaxes.

The exemplary DPFEE is shown in exemplary Procedure 1 below. For example, during initialization, the name syntax of all utilized headers can be placed in the PFP. For SIP, "Via", "v:", "Cseq", can be placed in the PFP. If the incoming packet can be a SIP packet, the Protocol analyzer can load the relevant PFP values into the HFM. The DFM can search for delimiter "CRLF" in the SIP packet. Multiple HFMs can be instantiated in order to find all headers in parallel. HLF can use the values from HFM and DFM to find the exact location of the header field. This corresponds to Phase 2 of Procedure 1. The HLF output can be translated using Address Translators into a format compatible for FEMEs (Phase 3 of Procedure 1). For SIP, the translated address can be the starting location of "Via", "CSeq", "Proxy-Authentication" and "Call-ID" in byte offset from the start of the packet. Each of the header locations can be announced to the respective FEMEs.

---

Procedure 1: DPFEE

Let POI = Protocols of Interest (SIP, HTTP, FIX, etc),
Let NumofFields = Number of main header fields of
interest for ADS/NIDS
Phase 1: Initialize Header Search Engine (HSE).
if PacketUnderTest ∈ POI then
    for i ← 1 to NumofFields do
        Load $HFM_i$ ← [PFP → (POI) → (i)]
        // header field syntax is loaded to HSE
        Map $FEME(POI)_i$ ← Thread i Phase 2: HSE finds location of header fields.
while DFM and HFM are deployed in parallel do
    for j ← 1 to number of Delimiters occurrences do
        Set d_loc(j) ← location no. of Delimiters +
        2    // find locations of Delimiters in packet -continued Procedure 1: DPFEE

```
|  |
|  for i ← 1 to NumofFields do
|  |  for k ← 1 to no. of occurrences of main header
|  |  fields do
|  |  |  Set h_loc(k) ← location no. of header
|  |  |  // find locations of reqd header field
|  |  |_
|  |_
|_
Correlate DFM and HFM outputs.
if k = 0 then
|  Set field_present ← 0          // header not present
else
|  for i ← 1 to k do
|  |  if h_loc(i) = d_loc(1...j) then
|  |  |  header_loc ← h_loc(i)
|  |  |  field_present ← 1      // determine the exact
|  |  |  location of header field
|  |  |_
|  |  else
|  |  |  field_present ← 0     // header name is
|  |  |  present in the packet, however it is not the
|  |  |  header field
|  |  |_
|  |_
|_
Phase 3: Address Translation.
for i ← 1 to NumofFields do
|  if field_present = 1 then
|  |  header_start_pos ← func
|  |  translate_addr(header_location)
|  |_
|_
Phase 4: Field Value Extraction.
for i ← 1 to NumofFields do
|  if field_present = 1 then
|  |  while field value extracted = 0 do
|  |  |  FEME(i) ← thread_i (header_start_pos)
|  |  |  // packet data streamed from header_start_pos
|  |  |  over the threads
|  |  |  func extract fields(i)    // each FEME
|  |  |  extracts field values from main headers based
|  |  |  on RFC of the protocol
|  |  |_
|  |_
|_
```

All or most FEMEs can extract the respective field values by accessing the packet data beginning from the starting location of the header. All FEMEs can work in parallel, which can speed up the field extraction. For the SIP example, FEME (e.g., Via FEME, for simplicity) can extract the source IP and Branch ID. Similarly, FEME (e.g., Cseq FEME) can extract the sequence number and the method. FEME (e.g., Proxy-Authentication FEME) and FEME (e.g., Call-ID FEME) can extract the nonce and call the ID, respectively. The extracted fields can be transmitted to a NIDS/ADS for security threat evaluation. The exemplary DPFEE can be placed in line with a security system to serve as a pre-processing module. Multiple DPFEEs can be implemented in parallel to support bandwidths over about 300 Gbps. A PFP can facilitate deep packet field extraction on different protocols using the same DPFEE.

Exemplary Implementation and Analysis of DPFEE

Figure 7:
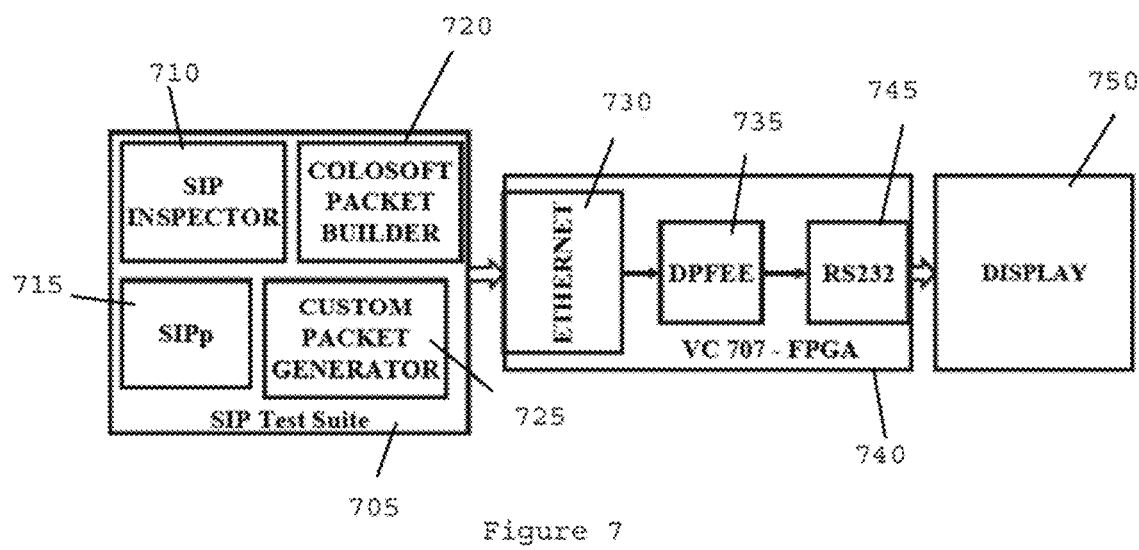
FIG. 7 is an exemplary diagram of an exemplary configuration used to verify the exemplary system, method and computer-accessible medium according to an exemplary embodiment of the present disclosure.

FIG. 7 shows a diagram of an exemplary setup/configuration to verify the exemplary DPFEE. The exemplary DPFEE was implemented on Xilinx Virtex-7XC7VX485T-2FFG1761C (e.g., VC707) FPGA.

The SIP test suite 705 is a collection of packet generator tools. Sip Inspector 710 and SIPp 715 can generate SIP packets. The Colasoft Packet Builder 720 can transmit sample captures downloaded from Wireshark, and packets captured during a VoIP call between Call Centric™ subscribers. A custom packet generator 725 generates SIP traffic with varying field lengths. The SIP test suite 705 can send the experimental SIP traffic to the FPGA over Ethernet 730. The lower layers, L1-L4 can be processed using Xilinx IP cores. The exemplary DPFEE 735 in the FPGA 740 can perform deep packet field extraction and can write the results to an output buffer. The results can be displayed using RS232 (e.g., element 745), which can be displayed on display 750. The resource utilization for the implementations is provided in Table 1 below. 10 DPFEEs were implemented on the Virtex-7 FPGA to obtain a bandwidth of about 257.1 Gbps. To facilitate easier scalability, each DPFEE can have its own buffers. With multiple DPFEEs, only a switch can be needed to select a non-busy DPFEE. With 75% of hardware, a bandwidth of over about 300 Gbps with 12 DPFEEs can be obtained.

TABLE 1

DPFEE resource utilization on Virtex 7 FPGA

| Parameters | 1 DPFEE | 10 DPEEEs | 12 DPFEEs |
| --- | --- | --- | --- |
| LUT | 6% | 61% | 74-76% |
| Slice Registers | 2% | 22% | 26-28% |
| Bandwidth | 25.71 Gbps | 257.1 Gbps | 308.5 Gbps |

Exemplary Analysis of DPFEE

For an exemplary protocol of interest, let: $N_h$=Number of utilized main headers, $N_{HFM}$=Number of HFMs deployed, $N_{AT}$=Number of ATs deployed, $t_{HSE}$=HSE latency, $t_{AT}$=AT latency, $N_{TB}$=Number of bytes streamed per FEME for each clock cycle, $f_{FEME}$=FEME operating frequency, and $N_f$=Total number of field values.

Headers can have multiple field values of interest. Thus, $N_f$ can be expressed as, for example:

$$N_f = \sum_{n=1}^{N_h} \sum_{k=1}^{M} F_{n_k} \qquad (1)$$

where $F_{n_k}$ can be the $k^{th}$ field of $n^{th}$ header; the total time taken to extract the fields for any packet ($T_{e_t}$) by the exemplary DPFEE can be generalized by, for example:

$$T_{et} = \left(\frac{N_h}{N_{HFM}} \times t_{HSE} + \frac{N_h}{N_{AT}} \times t_{AT}\right) +$$

$$\frac{\max(\sum_{k=1}^{M}(L(F_{1_K}) + D_{1_K}),}{}$$

$$\frac{(\sum_{k=1}^{M}(L(F_{2_K}) + D_{2_K}), \ldots \sum_{k=1}^{M}(L(F_{(N_4)_k}) + D_{(N_4)_k})}{N_{TB} \times f_{FEME}}$$

where $L(F_{n_k})$=length of $k^{th}$ field value in the $n^{th}$ header; $D_{N_k}$=Time to find start of the $k^{th}$ field in the $n^{th}$ header;

The values used in the experiments can be $N_h$=4, $N_f$=6, $N_{HFM}$=1, $N_{AT}$=4, $N_{TB}$=1. The module latencies can be: (i) $t_{HSE}$=8 ns, (ii) $t_{AT}$=8 ns and $f_{FEME}$=300 Mhz. For the exemplary experiment conducted, the maximum time spent by FEME to extract the field values varied from about 30 to about 100 clock cycles. This includes time taken to parse $L(F_{n_k})$ and $P_{N_k}$. Max $(\Sigma_{k=1}^{M}(L(F_{1_K})+D_{1_K}), (\Sigma_{k=1}^{M}(L(F_{2_K})+D_{2_K}),\ldots\Sigma_{k=1}^{M}(L(F_{(N_4)k})+D_{(N_4)k})=100$ can be used in Eq. (2). Using these values, the maximum time to complete field extraction can be found to be, for example:

$$T_{et_{max}}=373.33 \text{ ns} \Rightarrow P_{nub}=2.6786 \text{ Million PPS}$$

where $P_{min}$=Minimum number of packets processed expressed in PPS.

DPFEE has very low latency as seen from $T_{et_{max}}$. Even without considering the effects of pipelining in DFEEE components, at least about 2.678 million PPS can be processed. Considering an average packet size of about 1200 bytes, the minimum bandwidth of the exemplary DPFEE can be about 25.71 Gbps. For packets with smaller sizes, the bandwidth can increase as the maximum term in the numerator of Eq. (2) can decrease.

Eq. (1) can be a user requirement, and it can indicate the total number of fields utilized by NIDS/ADS systems. The time taken to extract all the fields in a packet $T_{et}$ can be given in Eq. (2). $T_{et}$ can be a combination of user controlled parameters for the exemplary DPFEE, inherent characteristics of the exemplary DPFEE and network traffic. The maximum time taken by the exemplary DPFEE to extract the fields can be controlled by $N_{HFM}$, $N_{AT}$, and $N_{TB}$. The extraction time can also be decreased using $t_{HSE}$, $t_{AT}$, and increased using $f_{FEME}$. However, this may require significant effort to further optimize the components of the exemplary DPFEE.

Exemplary DPFEE Experimental Results

Figures 8A, 8B:
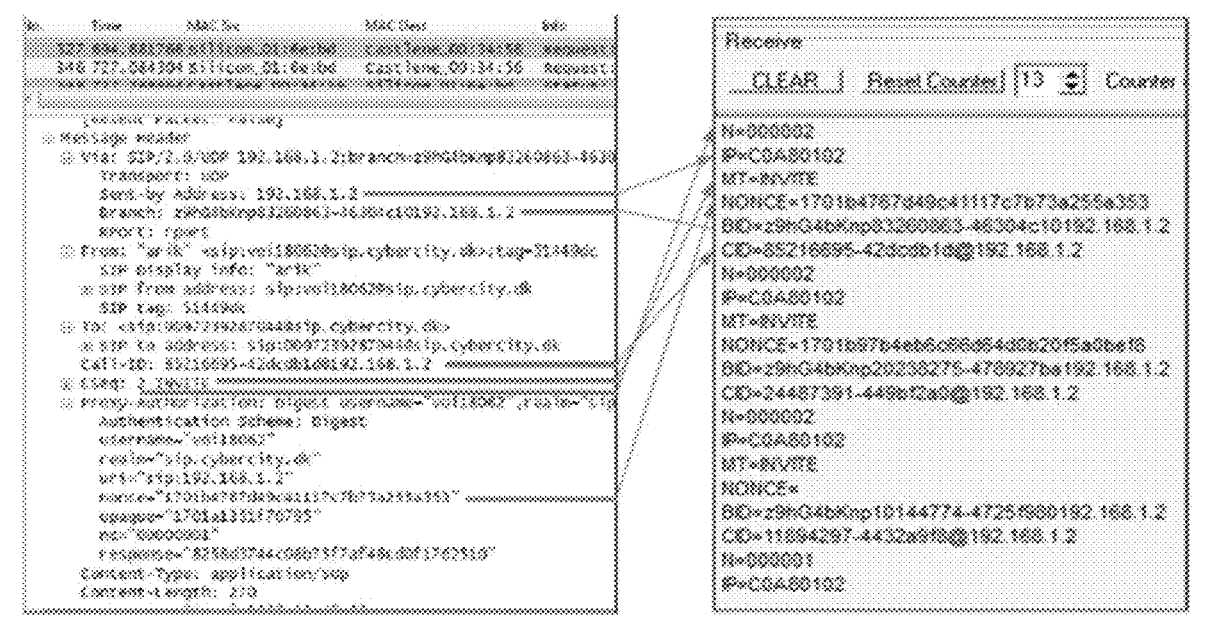

FIGS. 8A and 8B show experimental results achieved using the exemplary system, method and computer-accessible medium. FIG. 8A shows an exemplary image of Wireshark capture of the packet under test from the transmitter side. The packet under test can be taken from Wireshark's sample capture file. FIG. 8B shows an exemplary image of the extraction output. The exemplary DPFEE functionality has been verified for payload sizes from about 100-1500 bytes and the field extraction has an accuracy of 100% accuracy. Real-time SIP traffic from Call-Centric was also used to test the exemplary DPFEE and the results had the same 100% accuracy.

Exemplary Comparison with Existing Systems:

Out of the three open source IDSes, Snort (see, e.g., Reference 30) generally performs better than its counterparts—Suricata and Bro (see, e.g., Reference 37). From the open source SIP stack category, PJSIP (see, e.g., Reference 38) can be superior to OpenSIPs and oSIP (see, e.g., Reference 39). Thus, Snort and PJSIP can be chosen for the exemplary evaluation. SIPp (see, e.g., Reference 40) can be used to generate SIP traffic. The performance of PJSIP and Snort can be measured on a server with 12-core Intel Xeon W360 processor running at 3.47 GHz with 24 GB RAM.

Snort SIP preprocessor run times can be used for bandwidth calculation, neglecting the time spent on decoding, event queuing, etc. Similarly, the message parsing times of PJSIP can be used. For all the systems under test L1-L4 header processing overhead can be neglected. One DPFEE with 4 FEMEs and 1 Byte/Clock cycle/FEME can be used.

Figure 9:
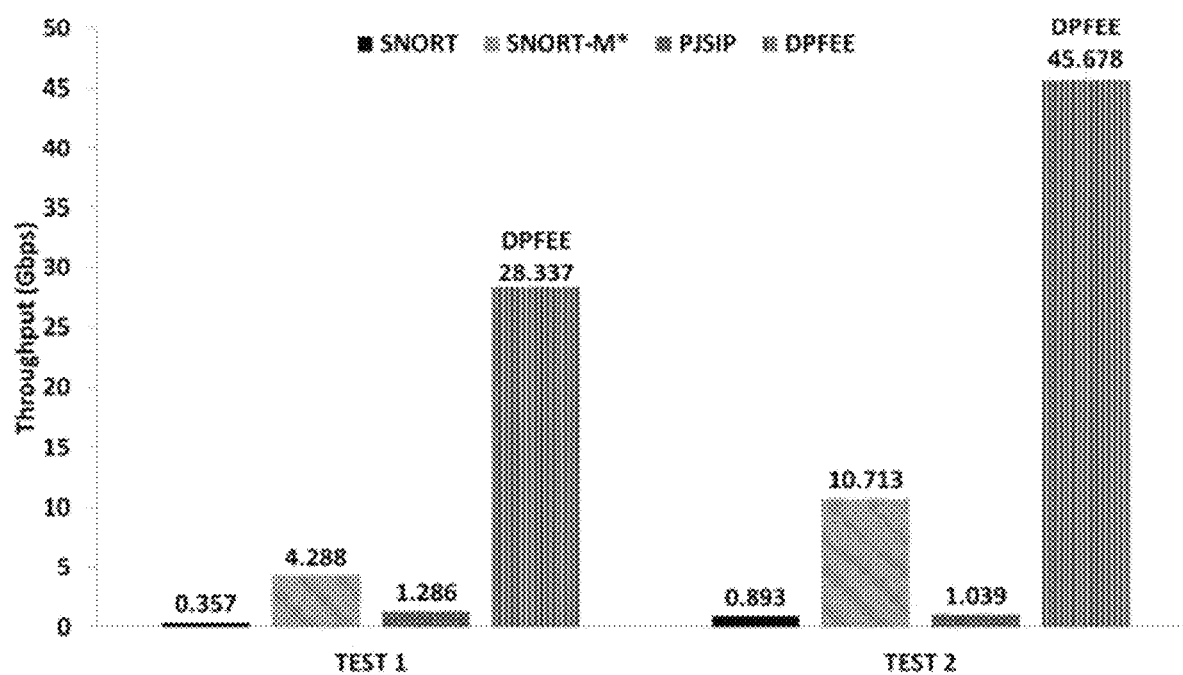
FIG. 9 is an exemplary chart illustrating a performance comparison between SNORT, SNORT Multiple instance (SNORT-M*), PJSIP and the exemplary system, method and computer-accessible medium according to an exemplary embodiment of the present disclosure.

Two exemplary tests were performed with different network traffic parameters as shown in Table 2 below. Results are illustrated in the chart shown in FIG. 9. The exemplary DPFEE can outperform both Snort SIP preprocessor and PJSIP parser achieving a speedup of 22×-80×. The bandwidth of Snort and PJSIP parser can be approximately 1 Gbps, with Snort performing poorly in Test 1 due to various factors. Currently, Snort cannot use more than 1 CPU. (See, e.g., Reference 37). However, it can be instantiated multiple times to run on multiple CPUs to scale bandwidth linearly. Even when 12 instances of SNORT run on 12 CPU cores, the bandwidth peaked to a maximum of about 10.7 Gbps; 4× lesser than single DPFEE bandwidth.

TABLE 2

SIP Tests

| TestNUm | Packets | PPS | Avg Length |
|---|---|---|---|
| 1 | 4.19 Million | 100000 | 571 |
| 2 | 6.51 Million | 65813.5 | 920 |

There are commodity hardware products with 100 Gbps DPI. However the exemplary results with their field extraction bandwidth cannot be easily compared since the procedures can be proprietary. Thus, the performance can be approximated by considering the number of processors/SoCs used in them. 32 custom processors can be used to achieve about 100 Gbps DPI. (See, e.g., Reference 8). The exemplary DPFEE can be used to operate beyond about 100 Gbps. However, the 32 SoCs can be used for both field extraction and DPI, along with other features.

For the Test traffic used in experiment: SIP preprocessing time for Snort takes around 30% of the resources to evaluate a packet a CPU load of 99.7%-100.1% and consumes 500 MB of memory. For the same traffic, PJSIP message parser averages around 37.9% CPU. The exemplary DPFEE reduces this load by 30-38%, which can be pivotal during DoS attacks.

Exemplary Features of DPFEE

The exemplary system, method and computer-accessible medium, according to an exemplary embodiment of the present disclosure, can be used to reduce the workload on DPI devices for text-based protocols. The exemplary DPFEE can offer the following features:

Exemplary Multi-Protocol Support:

the exemplary DPFEE can be configured to work for a single text-based protocol or set of different text-based protocols. The architecture can switch to different FEMEs based on the matched protocol.

Exemplary Content Awareness:

Most of the hardware components can be kept inactive for the packets that do not contain the protocol of interest. Packet data can be streamed only to specific FEMEs based on the matching protocol and presence of main header fields, thus reduces the power consumption.

Exemplary Multithreading:

Multithreading can aid all the FEMEs to extract their designated field values in parallel. This can help to accelerate the field extraction by a large factor. Without multithreading the term can become, for example:

$$\max(\sum_{k=1}^{M}(L(F_{1_k})+D_{1_k}),\sum_{k=1}^{M}(L(F_{2_k})+D_{2_k}),\ldots\sum_{k=1}^{M}(L(F_{(N_h)_k})+D_{(N_h)_k}))$$

in Eq. (2) can become $$\sum_{n=1}^{n=(N_h)_k}\sum_{k=1}^{M}(L(F_{(N_h)_k})+D_{(N_h)_k}),$$

which can significantly increase the field extraction latency.

Exemplary DPFEE Scalability

Exemplary Scalability:

The exemplary DPFEE can provide a high degree of flexibility to scale performance in multiple ways. Performance of the exemplary DPFEE can be proportional to the hardware requirement and can be scaled.

Exemplary Use of Multiple DPFEEs:

In an exemplary implementation, one instance of the exemplary DPFEE can utilize about 6% resources of Xilinx Virtex-7 FPGA. In one exemplary experiment, 10 DPFEEs were instantiated to process ten packets in parallel. The estimated bandwidth offered by the exemplary DPFEE scaled to about 257 Gbps, with just about 60% of hardware utilization. Using multiple DPFEEs in parallel can provide inter-packet parallelism.

Exemplary Increasing Bytes/Clock Cycle/FEME:

The current implementation can stream about 1 byte/clock cycle/FEME. The number of bytes/clock cycle/FEME NTB can appear in denominator of Eq. (2). Increasing this parameter can improve the performance of the exemplary DPFEE by reducing the time taken by FEMEs to find and extract the field values. Multiple FEMEs per DPFEE offers intra-packet parallelism.

Exemplary Support for Multiple Protocols—Runtime Configuration:

The exemplary DPFEE can be used to extract fields for multiple protocols. This can be achieved using reconfiguration at runtime. A Protocol Field Programmer can store header fields and delimiters of multiple protocols, and can dynamically load the header field name and delimiter into HSE based on the application protocol present in current packet received.

Figure 10:
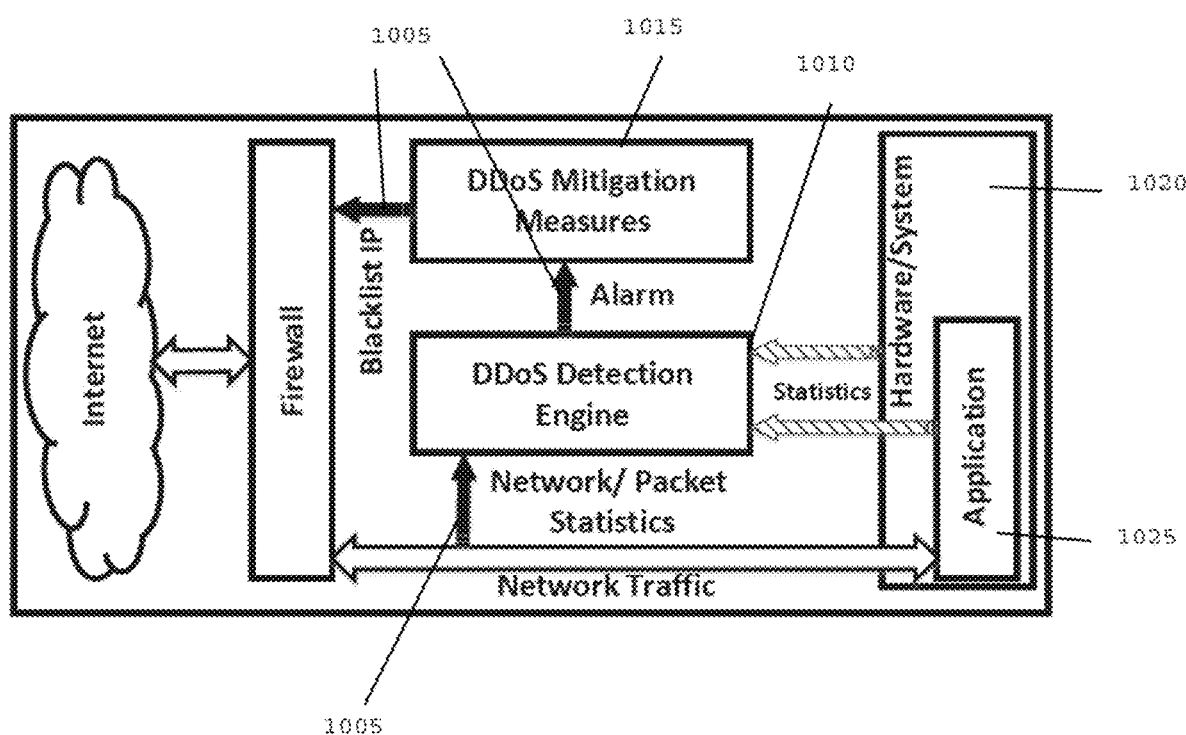
FIG. 10 is an exemplary diagram illustrating an exemplary DDoS detection flow according to an exemplary embodiment of the present disclosure.

Exemplary Behavior Based Adaptive Intrusion Detection in Networks: Using Low-Level Hardware Events to Detect DDoS Attacks Any attacks that are not detected by the initial state of DDoS defense procedures can ultimately affect the hardware. If the security components have visibility into the hardware layer (see e.g., arrows 1005 shown the diagram of FIG. 10), they could detect these changes, adapt (e.g., or vary) the parameter's threshold and detect the attacks (e.g., using DDoS Detection engine 1010). The threshold variation can increase the complexity of learning the threshold for an attacker and comprehensively mitigate DDoS attacks (e.g., using mitigation engine 1015). Most procedures are perimeter defenses that do not consider the hardware/system 1020 hosting the application 1025. If an attacker can learn the detection threshold, network traffic can be crafted to avoid the detection completely. If the DDoS Detection Engine 1010 doesn't raise an alarm, no action will be taken by any other security components.

An exemplary framework called BehavioR based Adaptive Intrusion detection in Networks ("BRAIN") can be used. The exemplary BRAIN can dynamically adjust the detection threshold by monitoring the host/service system state or behavior. The behavior of the host system can be characterized with the occurrences of low-level hardware events. Hardware Performance Counters ("HPC"), which can exist in most modern processors, can be used to automatically and efficiently count the monitored events. Dynamic threshold variation can be achieved by correlating network traffic statistics and HPC values using, for example, machine learning. This exemplary framework can be used to detect and mitigate DDoS attacks with very high accuracy. Current detection procedures can be predominantly based on packet statistics and signature detection in packets. The exemplary system, method and computer-accessible medium, according to an exemplary embodiment of the present disclosure, can utilize the behavior of the host and application/service under protection in combination with the statistics derived from network parameters. This can increase the accuracy of the DDoS detection. The exemplary BRAIN can be a passive analysis framework, meaning there may be no additional hardware in the traffic path. As the exemplary BRAIN uses low-level hardware events to model application behavior, the performance overhead to acquire the parameters can be very low.

Exemplary DDoS Defense Procedures

DDoS defense mechanisms can be classified into three primary categories (e.g., (i) source-end defense, (ii) Intermediate network defense, and (iii) Host-based defense) based on the locality of deployment. (See, e.g., References 55-57):

Exemplary Source-End Defense:

Defense mechanisms can be deployed at the source (e.g., attacker). Rate throttling can be employed to limit the rate of outgoing connections. It can be the best possible defense, however, it can be impractical since an attacker can disable it before starting DDoS attacks. (See, e.g., Reference 55). The primary problem with this approach can be the assumption that an attacker can somehow agree to deploy the throttling components, which in many cases may not hold true. MULTOPS (see, e.g., Reference 58) can detect and filter DDoS flooding attacks based on significant differences between the rates of traffic going to and coming from a host or subnet. It can use a dynamic tree structure for monitoring packet rates for each IP address, which can make it a vulnerable target to a memory exhaustion attack.

Exemplary Intermediate Network Defense:

Defense mechanisms can be deployed at intermediate network infrastructures which can provide service to many hosts. This can be a collaborative operation between multiple routers, and can aid in the detection and trace-back of attack sources. However, the primary difficulty can be the deployment. To increase the accuracy of the detection and capability of tracing attack sources, all the routers and network components in the internet need to deploy the defense mechanism. An attack detection can be achieved by monitoring the traffic patterns from the users in relation to the thresholds established by service-level agreement across several gateways. (See, e.g., Reference 59). A speak-up can be used to invite all clients of the DDoS victim to send additional payment traffic, with the assumption that attack machines are already sending close to their full capacity. (See, e.g., Reference 60). Clients that transmit an extensive amount of payment traffic can be considered legitimate and whitelisted. Since payment traffic needs to be sent continuously, this can create additional congestion for the victim which can be undesirable. A speak-up can be primarily used against session flooding, but may not be used against request flooding attacks. It can also be unclear how the server detects attacks. (See, e.g., Reference 56).

Exemplary Host-Based Defense:

The request volume, instant and long-term behavior can be monitored. (See, e.g., Reference 61). For every connection, they can provide downgraded services using a rate limiter. Instead of denying services to malicious users, connections greater than the threshold of the rate limiter can be dropped. This procedure can facilitate the attacker to consume system resources at a constant rate and thus, may not be able to prevent DDoS attacks at all. Application layer DDoS anomaly detection using Hidden semi-Markov model has been previously described. (See, e.g., References 62 and 63). These procedures model the behavior by page access, HTTP request rate, page viewing time, and requested sequence. Due to the procedure complexity, it may not be suitable for real-time monitoring. Various exemplary procedures exist for anomaly based DDoS detection using machine learning. (See, e.g., References 55-57 and 64). However, most of the procedures rely only on network parameters and application access parameters alone to model the attacks. The exemplary system, method and computer-accessible medium, according to an exemplary embodiment of the present disclosure, can use host's hardware parameters like CPU and memory utilization, and these parameters, used along with network parameters, can increase the accuracy of attack detection. (See, e.g., References 64-66). Using CPU and memory utilization may only detect an attack once the host becomes affected by the DDoS attack. It can be beneficial to detect the attacks right from the onset, and not after the system can be compromised.

Anomaly-based detection procedures rely on machine learning procedures that utilize features derived from inspecting packets and flows in network. These features usually utilize transformation before they can be used by a machine learning procedure. Feature extraction and transformation can incur a large performance overhead and per-flow methods may not suffice for application layer anomaly detection. (See, e.g., Reference 67). The exemplary system, method and computer-accessible medium, according to an exemplary embodiment of the present disclosure, can utilize HPCs which can be dedicated counters already present in the processor. The values from the HPCs can be used as features for the exemplary machine learning procedure. Thus eliminating the feature extraction and transformation overhead. This inherently aids the exemplary the exemplary BRAIN for use in real-time anomaly detection.

Another class of application DDoS attack detection procedures can use DPI, where the content of the application layer (e.g., L7) packet data can be inspected and matched against known malicious signatures. Snort (see, e.g., Reference 4), Surricata (see, e.g., Reference 68) and Bro (see, e.g., Reference 69) are a few examples of open-source DPI, which can employ this procedure. However, a problem can be resource utilization. (See, e.g., Reference 70). Attackers can randomize the application layer data to avoid detection by DPIs. (See, e.g., Reference 71).

Exemplary Hardware Performance Counters

HPCs are a set of special-purpose registers built into a modern microprocessor's performance monitoring unit to store the counts of hardware-related activities. HPCs were originally designed to conduct low-level performance analysis to help developers understand the runtime behavior of a program, and tune its performance more easily. (See, e.g., Reference 72). Working along with event selectors which specify the certain hardware events, HPCs can be programmed to count a specified event from a pool of events such as L1-data cache accesses, load misses and branches taken. Compared to software profilers, HPCs can provide access to detailed performance information with much lower overhead. HPC have been used to measure capacity of websites (see, e.g., Reference 73), perform power analysis and model energy consumption of servers (see, e.g., References 74 and 75) and evaluate performance of servers. (See, e.g., Reference 75). HPCs have been also used to detect kernel modifying rootkits and malware (See, e.g., References 76 and 77).

The exemplary BRAINs attack detection can be based on the characterization of hardware and the application. The exemplary BRAIN can determine whether the host hardware can behave differently during an attack on the application and during normal operation. To accurately differentiate the host hardware behavior during load and attack, HPC statistics can be correlated with network and application statistics. The set of features involved in DDoS detection can include statistics from three exemplary categories.

Exemplary Hardware Statistics:

HPC values from different hardware events can be used to characterize the host behavior.

Exemplary Network Statistics:

Network parameters, like number of concurrent active connections and unique users that affect the HPC values can be used.

Exemplary Application Statistics:

Parameters, including, e.g., a number of unique users concurrently accessing the application can be used to determine the load on the application.

Detection of DDoS attacks in the exemplary BRAIN can be based on a magnitude of hardware events measured using HPCs. These events can vary based on the manufacturer, generation and configuration of the processor used in the host system. An exemplary procedure used before deployment of the exemplary BRAIN can be "Model Building," which can focus on the selection of hardware events.

Exemplary BRAIN Model Building: Selection of Events

High-fidelity hardware events can be selected to ensure early detection of DDoS attacks. During the exemplary model building phase, the stability and sensitivity to attacks of all the available hardware events can be measured for the idle, user and attack cases. The attacks can be performed with widely-used DDoS tools. Different types of DDoS attacks can be performed, and the attacks can be carried over the Internet in order to simulate a realistic scenario. The stability analysis can be performed with heavy user traffic or heavy system load. Events with very low sensitivity and high standard deviation can be filtered out after stability analyses. The remaining events with high sensitivity can represent the possible candidates as the "features" for the exemplary machine learning procedure.

Exemplary Idle Profile:

Application/service can be running and no user is accessing the application.

Exemplary User(s) Profile:

Legitimate users are accessing the application and no attackers are present.

Exemplary Attack Profile:

One or more DDoS attackers are present along with legitimate users. The attacks are performed using DDoS tools widely-used by hackers. Different types of DDoS attacks are performed and the attacks are carried over the internet in order to simulate a realistic scenario. This procedure can be carried out by the penetration testing team.

After obtaining the HPC event's values for the above scenarios, they can be subjected to further analysis to select the best candidates for the exemplary BRAIN.

Exemplary Sensitivity Analysis:

This can measure the change of HPC event's values from (i) attack to user and (ii) user to idle profiles. Events with a larger change during attack to user can be good candidates to differentiate between attacks and a normal case. Sensitivity ("S") can be expressed as, for example:

$$S=[(Attack/User)-(User/Idle)]/(User/Idle)$$

Events with sensitivity less than 1 can be filtered out, and the remaining events can be subjected to stability analysis.

Exemplary Stability Analysis:

This can signify the HPC event's consistency for different samples taken under the same load and measured using standard deviation. Events with lower standard deviation can be preferred.

Exemplary Stability Analysis for Different System Load:

This can signify the HPC event's consistency for different samples taken under heavily loaded system, and measured using standard deviation. This exemplary procedure can be utilized to reduce or eliminate false alarms and to avoid identifying a normal case as attack. Events with lower standard deviation can be preferred.

Events with very low sensitivity and high standard deviation can be filtered out after stability analyses. The remaining events with high sensitivity can represent the possible candidates as the "features" for machine learning procedure.

Exemplary Feature Selection and Feature Ranking

Feature selection can be used to reduce the number of events utilized to differentiate the attacks from a normal case. An exemplary recursive feature elimination ("RFE") procedure (see, e.g., Reference 78) can be used for feature selection. In RFE, an exemplary model can be constructed repeatedly, and the best performing feature can be selected and set aside. This process can be repeated using the rest of the features until all the features can be exhausted. The time of feature elimination can be used to rank the features, and a best performing subset can be found.

Feature ranking can provide information on the contribution of each of the selected events to differentiate the attacks from the normal cases. An exemplary random forest-mean decrease accuracy ("R-MDA") procedure can be used to rank the features. Random forest can be an ensemble learning method that includes multiple decision trees. (See, e.g., Reference 79). Each node in the decision trees can be governed by a condition on a single feature intended to divide the dataset into two, such that similar response values belong to the same set. RF-MDA can measure the influence of each feature on the accuracy of the model. The values of each feature can be permuted, and changes in the accuracy of the model due to permutation can be observed. The features that do not cause significant changes to accuracy, while permuting, can be considered unimportant features. Combining the results from RFE and RF-MDA can provide an exemplary set of HPC events that can aid in differentiating the hardware behavior for attack and normal traffic.

Figure 11:
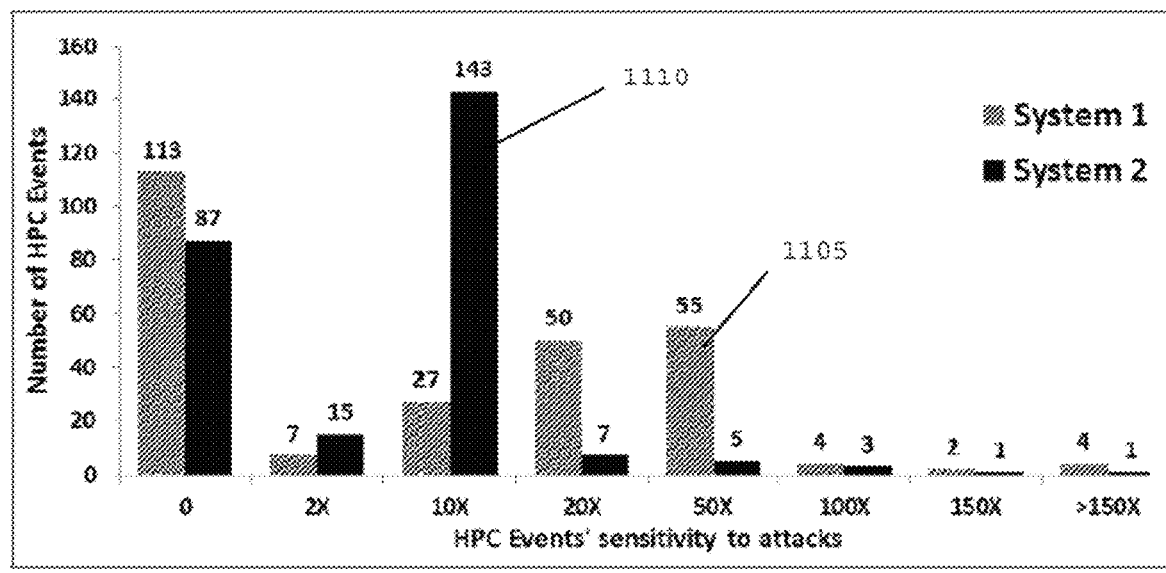
FIG. 11 is an exemplary histogram diagram illustrating exemplary sensitivity analysis results of the exemplary system, method and computer-accessible medium according to an exemplary embodiment of the present disclosure.

The exemplary BRAIN model building methodology was experimented on a system running Ubuntu Server 14.04 with 3.6 GHz Intel i7-3820 Quad-core processor with 10 MB Intel Smart Cache cache and 16 GB RAM. 262 HPC events were obtained from Intel's developers manual. (See, e.g., Reference 80). Sensitivity analysis was performed by subjecting the events to TCP and HTTP DDoS attacks, and the obtained results are shown in shown in the chart of FIG. 11. The hardware event responses were specific to systems. Exemplary results are shown by System 1 (e.g., element 1105) and System 2 (e.g., element 1110) shown in the chart of FIG. 11, running Ubuntu Desktop 12.04 with 2.66 GHz Intel Core2 Q8400 Quad-core processor with 4 MB L2 cache and 8 GB RAM. It can be observed that multiple highly sensitive HPC events can be available for modeling the attacks. For example, FIG. 11 shows a histogram of sensitivity analysis results of System 1 (e.g., element 1105) (e.g., Intel i7-3820) and System 2 (e.g., element 1110) (e.g., Intel Core2-Q8400). Results obtained from measuring HPC events during HTTP and TCP DDoS attacks. 113 events in System 1 and 87 events in System 2 are insensitive to attacks. System 1 has 115 events while system 2 has 21 events that are greater than 10× sensitive.

Obtained highly sensitive events can include instructions or micro-operations (uops), branch operations, latency or stall operations, page-walks or translation look-aside buffer ("TLB") operations, L1 and L2 cache operations, SIMD and SSE2 arithmetic and logic operations, memory operations and other machine based operations such as assertion of cycle machine clear. A large number of events can be used to model the hardware behavior. However, machine learning procedures can suffer from the curse of dimensionality. A large number of features can incur high performance overhead, and can even become unsuitable for real-time application. The most sensitive and stable events were chosen for further processing.

Stability analysis can be performed by repeated sampling of the events under normal and high system load. In the exemplary experiment, the events were sampled at normal system load of about 0.03 and high system load of about 3.84. Results are described below. Events that produce large deviations are filtered out. This can aid in reducing or even eliminating false alarms during attack detection.

Figure 12:
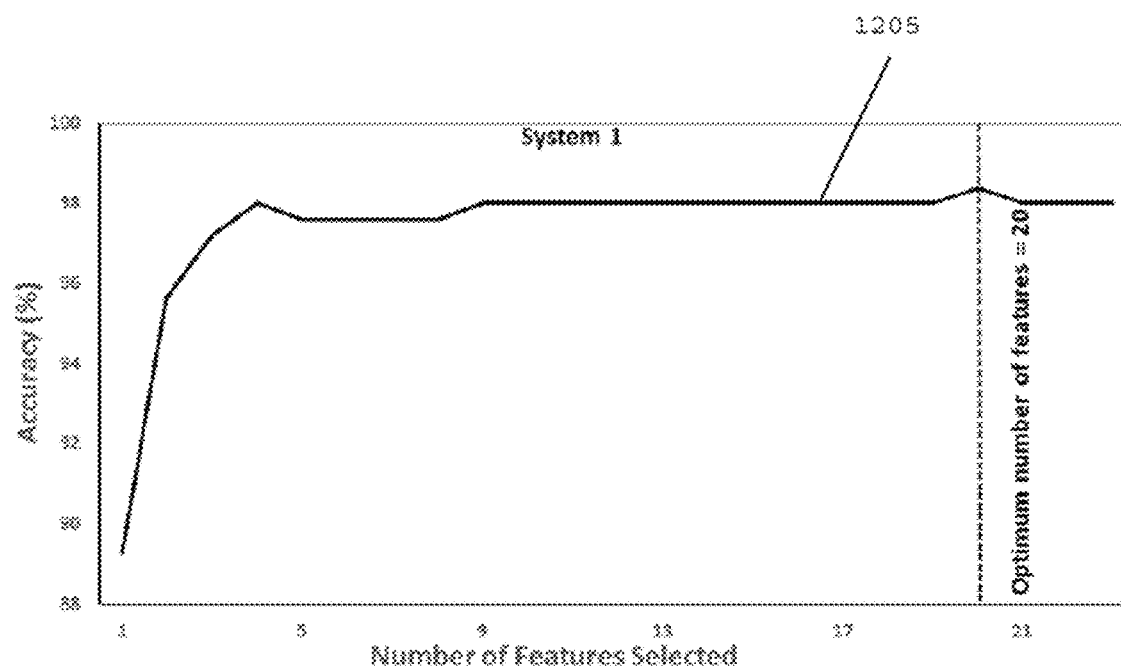
FIG. 12 is an exemplary graph of exemplary Recursive Feature Elimination results according to an exemplary embodiment of the present disclosure.

Any number of events utilized for attack detection (e.g., an optimum number) can be found using RFE as shown in graph of FIG. 12. For example, FIG. 12 illustrates exemplary Recursive Feature Elimination results 1205 where an optimum number of features utilized for the attack classification is 20. The exemplary list of events can be selected based on the RF-MDA results shown in Table 3 below.

TABLE 3

HPC event selection: Final set of events ranked and selected based on importance score. The higher the score of an event, the larger the impact on the attack classification problem can be. (TLB = Translation look-aside buffer, STLB = Second level TLB, DTLB = Data TLB, L1D = L1 Data Cache)

| Rank | Event Name | Score |
|---|---|---|
| 1 | Lines brought into the L1 data cache | 0.899 |
| 2 | No. of cycles Uops executed issued from port 0 - related to Integer arithmetic, SIMD and FP add Uops | 0.889 |
| 3 | Near unconditional calls retired | 0.88 |
| 4 | Read For Ownership (RFO) requests that hit L2 cache | 0.868 |
| 5 | DTLB Load misses that cause a page walk | 0.863 |
| 6 | Uops retired | 0.859 |
| 7 | Completed page walks due to load miss in the STLB | 0.858 |
| 8 | No. of cycles cacheline in the L1D cache unit is locked | 0.858 |
| 9 | instructions written into the instruction queue every cycle | 0.856 |
| 10 | No. of cycles Uops executed were issued | 0.855 |
| 11 | No. of times the front end is resteered - when Branch Prediction unit cannot provide correct predictions | 0.835 |
| 12 | No. of Allocator resource related stalls: Includes stalls arising during branch misprediction recovery synchronizing operations, register renaming and memory buffer entries | 0.832 |
| 13 | No. of L2 lines evicted for any reason | 0.818 |
| 14 | Uops issued | 0.776 |
| 15 | L2 RFO operations due to HW prefetch or demand RFOs | 0.773 |
| 16 | L2 instruction fetches | 0.765 |
| 17 | L2 demand lock RFO requests | 0.757 |
| 18 | No. of of modified lines evicted from the L1 data cache due to replacement | 0.734 |
| 19 | No. of retired loads that hit the L2 data cache | 0.636 |
| 20 | No. of cycles instruction execution latency became longer than the defined latency due to instruction used a register that was partially written by previous instruction | 0.636 |

The exemplary features described herein were subjected to unsupervised clustering to discover natural clusters/groups, and supervised classification, to build an exemplary model utilized by the exemplary system, method and computer-accessible medium to differentiate hardware behavior during DDoS attacks and normal traffic. K-means can be chosen for unsupervised clustering and Support Vector Machine ("SVM") for supervised classification. The exemplary model can be trained with normal, legitimate users, and TCP and HTTP DDoS attack.

Exemplary BRAIN Architecture

Figure 13:
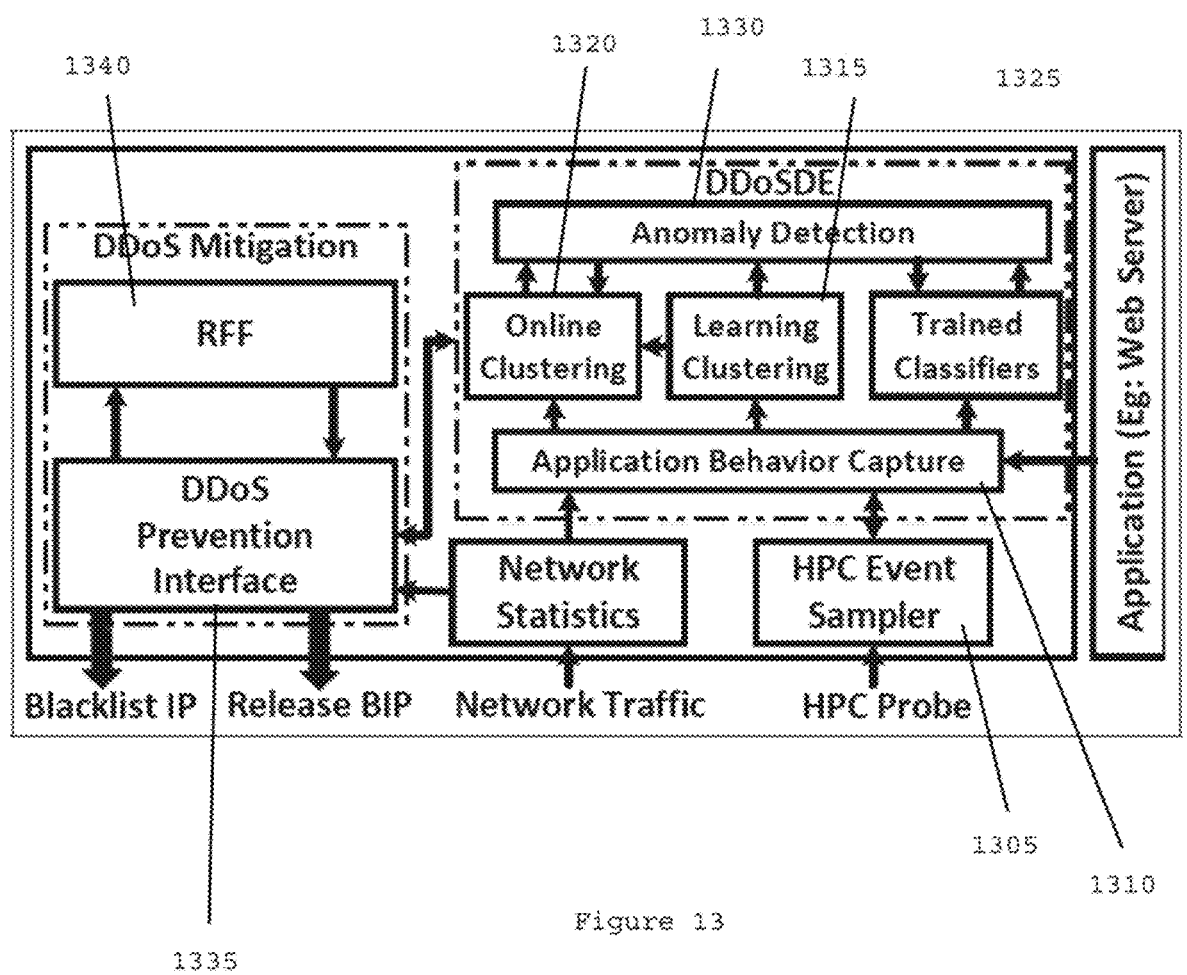
FIG. 13 is an exemplary diagram illustrating an exemplary architecture of the exemplary system, method and computer-accessible medium according to an exemplary embodiment of the present disclosure.

The exemplary architecture of the exemplary BRAIN is shown in the schematic diagram of FIG. 13. A brief description of each of the exemplary BRAIN components is provided below:

For example, the HPC Event Sampler 1305 can obtain the HPC values for the event list periodically. The number of HPCs can be limited, and can depend on the processor. Some HPCs can be reserved for the exemplary system based operations like a watchdog timer. The utilized event's count for the utilized application/service can be obtained by using multiple HPCs in parallel on a time-shared basis. Four events are measured every 1 second using 4 HPCs. Thus, it takes 5 seconds (e.g., 20 Events/4 per second) to measure all the events.

The Application Behavior Capture 1310 can assemble the utilized values from all the layers (e.g., hardware, network and application), and can create the feature vector format compatible for the exemplary machine learning procedures. This feature vector can signify one data sample representing the behavior of the system and the application.

Learning Clustering 1315 can utilize unsupervised K-means clustering instance in continuous learning mode.

Online Clustering 1320 can utilize unsupervised K-means clustering instance to find the cluster membership of real-time data samples. No learning may be supported. Training classifiers 1325 can utilize supervised SVM classification using the trained model obtained during the exemplary BRAIN's model building phase. An exemplary SVM procedure can be used. (See, e.g., Reference 81).

Anomaly Detection 1330 can be used to determine if the system is under an attack and can report to mitigation components to take further action.

These components together can form DDoS Detection Engine ("DDoSDE")—building block of the exemplary the exemplary BRAIN that can aid in detecting DDoS/DoS attacks by monitoring the host hardware behavior.

DDoS Prevention Interface ("DDoSPI") 1335 can host the attack response rules. It can be involved in threshold variation, blacklisting IPs and removing IPs from blacklist.

Remember & Forget Function ("RFF") 1340 can be used for producing dynamic values of blacklisting duration for each attack IP based on the IPs profile.

Exemplary BRAIN Methodology and Working

A. Exemplary DDoSDE

DDoSDE can host machine learning procedures to detect the presence of anomalies in application behavior. The application behavior can be derived using three different subsets of data from: (i) hardware events count for application from HPC, (ii) network statistics and (iii) statistics from the application itself.

Exemplary Hardware Events:

Twenty hardware events obtained from the exemplary BRAIN model building phase can be monitored.

Exemplary Network Statistics:

Exemplary parameters can include the number of unique users and connections per user/IP. Statistics based on frequency of HTTP GET and POST requests per source IP can also be used.

Exemplary Application Statistics:

The number of unique users connected to the application can be obtained from a log file of the application and the number of application processes spawned in the OS.

For the exemplary experiment, an exemplary K-means clustering procedure can be used, followed by an exemplary SVM classification procedure to detect anomalies in the application behavior. K-means clustering can be an unsupervised learning procedure and powerful clustering procedures, as it can be used to detect unknown attacks.

Exemplary Real-Time Clustering and Classification:

Using K-means clustering procedure in real-time DDoS defense system may not be a practical option. The addition of even a single data point can make the procedure traverse the complete dataset already processed to determine the cluster membership for the new data point. As the number of observation points can increase, the duration to produce the output can become significantly high. Exemplary modifications to the implementation of K-Means can be made such that it can be used in a real-time DDoS defense system. For example, the K-means clustering shown above can be used to determine the centroid values of clusters for dataset obtained by testing the system with test network traffic containing legitimate user traffic and attack traffic. It can be called "learning K-means" since it can update the centroid based on every data sample it receives. The centroids can be sent to "online K-means" shown in procedure 3 below. This procedure can lack the centroid update phase, and can lack learning, but it can be used to determine a data sample under the test's closeness to a cluster in real-time. The exemplary system, method and computer-accessible medium, according to an exemplary embodiment of the present disclosure, can use two different versions of K-Means: (i) one implementing the complete iterative functionality and (ii) another used to find cluster membership of data samples. This can facilitate the use of a machine learning procedure for real-time anomaly detection, without sacrificing the learning capability. The faster online instance can update centroid values from slower learning instances at regular intervals. If the data sample falls into either the normal or attack clusters, a decision can be made using K-means alone. Otherwise, the closeness of data sample to the clusters can be measured using SVM classification. If the data sample under test falls near the attack cluster, then the anomaly can be said to be detected and informed to DDoSDE.

---

Procedure 2: K-Means Procedure-Learning Instance

---

Let k = Number of clusters,    // User requirement
Let n = Number of data samples in training set,
Let f = Number of features for each data point    // The parameters used for modeling application behavior are called as features
input: $x_i$ = Feature data values $\forall$ i = 1...f
Phase 1: Initialize the centroids of clusters $C_i$ $\forall$ i = 1...k
Phase 2: Evaluate the each data points (x) to find their cluster membership
while Membership Unstable (Cluster membership of data points change) do
|     1: Calculate the euclidean distance of each object
|     from the centroids    // Measure closeness
|     for j ← 1 to n do -continued Procedure 2: K-Means Procedure-Learning Instance

| | $d(x, C) = \sqrt[2]{\sum_{j=1}^{j=f} (|x_j - C_j|)^2}$

| | 2: Assign the samples to clusters based on minimum
| | distance                                   // Assignment
| | 3: Assign a new centroid values $C_i$ ∀ i = 1...k using
| | average of group members
| |                                        // Update Centroid
| iterate until convergence
Phase 3: Output the centroid values Exemplary Classification Using Support Vector Machine:

SVM is a supervised learning procedure and can be used for classification. SVM is described below. SVM can have a higher accuracy than K-means. However, the performance overhead can be considerably higher than K-means (e.g., 7×-10×). The exemplary BRAIN can use both procedures. SVM can be activated only when K-means can be unable to decide if the current sample under test belongs to an attack or a non-attack cluster (e.g., based on distance output from online K-means in procedure 3). This can eliminate the need to run every sample through SVM. Thus, the overall performance can be reduced while keeping the accuracy high.

Exemplary DDoS Mitigation:

DDoSPI can communicate with a firewall or IPTables to blacklist BAD IPs that violate the facilitated threshold, for instance, the maximum number of concurrent connections. On initialization, the threshold for the maximum number of connections facilitated can be set by the user in DDoSPI. When DDoSDE informs the presence of anomaly in application behavior, DDoSPI can use network statistics to identify the threat. The threshold for maximum connections can also be changed to a new value lower than the previous one. This value can be set to a few connections less than the maximum connections used by an IP at that particular instant of time. Due to this variation, IPs that continue to create connections at their previous rate would cross the new threshold, and can be classified as a BAD IP. BAD IPs can be blacklisted using a Firewall and can be sent to RFF. RFF can produce dynamic values of blacklist times for each individual BAD IP based on the profile history derived from the past behavior (e.g., frequency of attacks) of the BAD IP with the system under protection. When DDoSDE reports the absence of an anomaly for a specific interval of time, DDoSPI can relax the threshold in incremental procedures until the user specified threshold can be reached. Due to threshold variation, the attacker has to deploy additional machines to get the desired effect. The initial set of attack systems used by the attacker can be detected; the attacker has to use a new set of systems to perform DDoS attack. Thus, DDoSPI can increase the cost for the attacker. RFF can also employ dynamic scaling of blacklist times along with dynamic variations of threshold to effectively mitigate DDoS attacks from botnets. The exemplary BRAIN can detect application layer DDoS and TCP DDoS attacks.

Procedure 3: K-Means Procedure-Online Instance input: $x_t$ = data sample obtained from real-time
  monitoring ∀ t = 1...f
input: $C_i$ ∀ i = 1...k Procedure 3: K-Means Procedure-Online Instance // k and f are same values used in learning mode
while BRAIN is running do
| Update regularly $C_{fixed_i}$ ← $C_i$ ∀ i = 1...k ←
| Learning Mode output
| 1: Calculate the euclidean distance of the current data
| sample from the centroids
|
| $d(x, C) = \sqrt[2]{\sum_{i=1}^{f} (|x_i - C_i|)^2}$
|
| 2: Current sample $x_t$ belong to the $Cluster_i$ that
| produces least euclidean distance
| $Cluster_i \in x_t \rightarrow \min_{\forall i=1,...k} d(x, C_i)$
| 3: Output Cluster number and distance values Exemplary RFF This exemplary module can assist in producing dynamic values of blacklist duration (e.g., the duration of blacklisting an attack IP or BAD IP in firewall) based on the profile of the attacker. The profile of the attacker currently can be based on the attack frequency from the same IP. The more an IP attacks the exemplary BRAIN, the more it can be penalized by increasing the blacklist duration non-linearly. RFF format is similar to Table 4 below. Each BAD IP can be associated with attack ID and three parameters derived from the attacker profile.

TABLE 4

RFF Table format

| IP Address | Attack ID | Attack Count | Blacklist Period | Remember Time |
|---|---|---|---|---|
| 1.2.3.4 | 1 | 10 | 53 mins | 782 mins |
| 192.168.7.40 | 2 | 1 | 30 mins | 66 mins |

RFF can receive the BAD IPs from DDoSPI module. If there can be no attack entry associated with the IP in the RFF table, it can be considered as a new attacker. The default blacklist duration can be sent to DDoSPI, and a new table entry can be created with default values. If the same BAD IP attacks the system again, the attack count can be incremented, and blacklist duration can be scaled based on the attack count using Blacklist-Scaling function.

Figure 14:
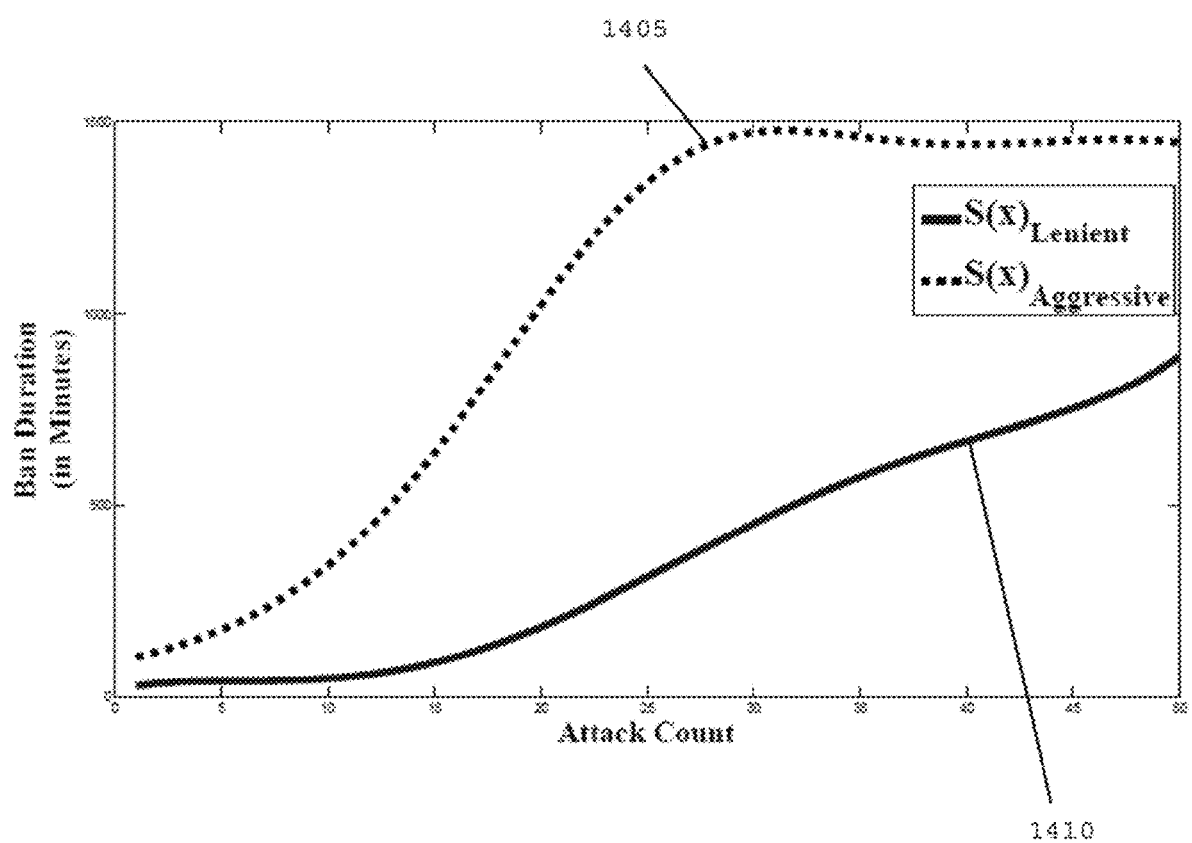
FIG. 14 is an exemplary graph of an exemplary Blacklist/Ban duration scaling model according to an exemplary embodiment of the present disclosure.

Exemplary Blacklist Duration-Scaling Function:

Scaling the blacklist duration for a BAD IP, as the frequency of attack increases, adds another layer of complexity to the defense system. The impact of DDoS attacks generated by automated attack tools can be reduced, as detection of subsequent attacks by the same IP can cause longer blacklist duration. This can depend on the blacklist duration-scaling factor primarily on the distance from the attack cluster (e.g., output of procedure 3). If the sample can be nearer to attack cluster (e.g., it doesn't belong to attack cluster), then the blacklist duration function can be based on Eq. (3). This can impose relaxed blacklist times for users BAD IPs with attack lower frequency, and can increase the blacklist duration almost linearly for an increase in frequency of attacks. Aggressive scaling can be performed when the sample belongs to an attack cluster using the function in Eq. (4). In this exemplary scenario, the blacklist duration can scale exponentially for attacks with a frequency between about 5 to about 30. Thus, if the sample belongs to an attack cluster, it can be considered as a known attack and, the attacker can be penalized aggressively. Blacklist duration scaling responses produced by both these modes are shown in the graph of FIG. 14, which shows $S(X)_{Linient}$ 1405 and $S(x)_{Aggressive}$ 1410. Thus, for example:

$$S_f(x)_{Linient} = \rho_1 * x^5 + \rho_2 * x^4 + \rho_3 * x^3 + \rho_4 * x^2 + \rho_5 * x + \rho_6 \quad (3)$$

where x=frequency of attack, $\rho_1 = 3.766*10^{-5}$, $\rho_2 = -4.638*10^{-3}$, $\rho_3 = 0.1883$, $\rho_4 = -2.434$, $\rho_5 = 12.72$ $$S_f(x)_{Aggressive} = a_1 * \exp\left(-\left(\frac{x-b_1}{c_1}\right)^2\right) + a_2 * \exp\left(-\left(\frac{x-b_2}{c_2}\right)^2\right) \quad (4)$$

where $a_1 = 1441$, $b_1 = 48.86$, $c_1 = 29.28$, $a_2 = 603.3$, $b_2 = 25.59$, $c_2 = 11.5$ and $S_f(x) \forall x \geq 2$ Exemplary Remember Function:

The remember function can determine the duration of keeping an attack IP in the RFF table. The premise can be that remembering IPs that repeatedly attack the system can facilitate subjecting them to longer blacklist times, and can reduce the impact of such attackers. This exemplary functionality can be modelled as a sum of present blacklist duration value and previous blacklist duration value shown in Eq. (5) by using the same equations given in Eqs. (3) and (4). The duration of remembering an attack from an attacker can be based on these equations. Having an exemplary non-linear model can create additional complexity for an attacker to deduce or learn the model. Thus, these equations can be obtained by curve fitting desired response. The remember times cam be modelled using different models based on their needs. Thus, for example:

$$R_f(x) = S_f(x)_{present} + S_f(x)_{previous} \quad (5)$$

Exemplary Forget Function:

The forget function can delete the BAD IPs from the RFF table entry. This function can help the system to forget about attacks from a BAD IP when the remember time expires. A BAD IPs remember time can expire if and only if, the BAD IP did not attack the system for the duration of the remember time. Thus, the BAD IP can be rewarded for not attacking the exemplary system frequently by forgetting its previous attacks altogether.

If it was the first time, the default value of T (e.g., 5 minutes) can be reported to DDoSPI. The IP can be blacklisted in the firewall for the default duration of T (e.g., 5 minutes). If the IP had attacked the system before, the count value associated with RFF table can be obtained to find the number of times the IP attacked the system (e.g., Ac). A new T can be generated for the particular IP based on a function: T=f (Ac, T) (T can be directly proportional to Ac, the number of times attacked). The new T value (T) can be sent to DDoSPI. The more an IP attacks the system, the longer it can be blacklist duration in the firewall.

Exemplary Threat Model

The exemplary threat model can include a target web server protected by a rate limiting DDoS defense tool, an attacker with access to number of zombies or attack supporting systems. Zombies can be virus-infected computers under the control of the attacker. Attack supporting systems can be systems controlled by other people working with the attacker. Usually, attackers have access to both, and can use combinations of these resources to attack the target system. The total number of attack systems available to the attacker be $Z_n$. The attacker can perform a two procedure DDoS attack.

Exemplary DDoS Procedure 1:

The attacker can use one attack system to find the maximum number of concurrent connections ($N_{max}$) facilitated by the DDoS defense tool in the target.

Exemplary DDoS Procedure 2:

The attacker can launch a DDoS attack by deploying $Z_n$ attack systems with ($N_{max}-1$) connections. After a period of time, the web servers can become less responsive to the legitimate users causing delay in load times. If the DDoS attacks still persist, the web server can become inaccessible and can finally crash.

Since the attacker can use ($N_{max}-1$) concurrent connections to connect every attack system to the web server, the DDoS defence tool would not consider it as malicious traffic and can facilitate the communication to continue. The static threshold for rate-limiting can be the only cause for detection failure. This can be true for every rate-limiting DDoS defense tool.

An attacker being able to determine the threshold for rate-limiting can be a practical scenario. To mimic this scenario, an exemplary attack tool was developed that can deduce any network application's rate-limiting threshold.

Exemplary Analysis of Threat Model

Considering a network application, such as a web server, has total resources denoted of $R_{Target}$. Let $N_x$ be the number of connections a system x (e.g., legitimate/attacker) makes to the web server. If the DDoS attack crashes the server at time $\delta t$ time, then the DDoS attack resource can be modeled by the following exemplary equation:

$$DDoS \text{ at } \delta t = \frac{R_{Used}(\delta t)}{R_{Target}} \geq 1 \quad (6)$$

where $R_{Used}(\delta t)$=total resource consumed at time $\delta t$ can be expressed using:

$R_{Used}(Z_n)$=Target resources consumed by $Z_n$ attack systems, $R_{used}(U_n)$ Target resources consumed by $U_n$ legitimate users.

$$R_{Used}(\delta t) = R_{Used}(Z_n) + R_{Used}(U_n) \quad (7)$$

$$= \sum_{n=1}^{Z_n} R_{Used}(N_{max} - 1) + \sum_{k=1}^{k=U_n} R_{Used}(N_k)$$

$$= R_{Used}(N_{max} - 1) * \sum_{n=1}^{Z_n} 1 + \sum_{k=1}^{k=U_n} R_{Used}(N_k)$$

$$R_{Used}(\delta t) = R_{Used}(N_{max} - 1) * Z_n + \sum_{k=1}^{k=U_n} R_{Used}(N_k)$$

From Eqs. (6) and (7), the relationship between DDoS attack, the threshold and number of attack systems utilized by the attacker, can be expressed as, for example:

$$DDoS \text{ at } \delta t \propto Z_n \quad (8)$$

$$Z_n \propto \frac{1}{N_{max}}$$

$$DDoS \text{ at } \delta t \propto \frac{1}{N_{max}}$$

From Eq. (8), for any DDoS defense system, the $N_{max}$ threshold can also determine the attacker resource. The resource for an attacker can be inversely proportional to the detection parameter threshold governed by $N_{max}$.

Exemplary Attack on Current DDoS Tools:
Threshold Detection Automation

Current rate-limiting DDoS defense mechanisms can be vulnerable to attack. An automated tool to deduce the DDoS detection threshold of network systems employing rate-limiting defense mechanisms can be utilized. Using this tool, Apache Web Server protected by DDoS-Deflate was successfully compromised in less than an hour.

The attack starts by flooding a target system with a low number of packets per flood. At specific intervals of time, the target system can be probed to determine if communication can be possible between the attacker and target. If it can be possible, the number of packets per flood can be incremented by a large number, and the procedure can be repeated until no communication can be possible. This can correspond to imposing a blacklist on the attackers IP by the target DDoS defense system. The ban can then be lifted at the target. Once the ban can be lifted, the number of packets per flood can be reverted back to the last known successful flood number. Then the procedure of incrementing the number of packets per flood can be repeated, but this time the increment occurs by 1. The procedure can be repeated until the attack can be banned again by the target. The boundary of the defense can be determined by the last known successful number of packets per flood. The time duration between the first communication failure and communication established can provide the "ban time" of the DDoS defense system. The tool sleeps for the duration of ban time. After the ban can be lifted again, an attack can be launched for the user specified duration with one connection less than the maximum number of facilitated connections. This attack can be undetectable at the target system due to the "static threshold" for a rate-limiting defense mechanism.

The exemplary procedure of threshold detection can rely on rate-limiting defense mechanisms to blacklist the attacker. The first ban can provide a coarse estimation of the threshold. While the second blacklist can help to determine the exact threshold of the DDoS defense tools. The exemplary system, method and computer-accessible medium, according to an exemplary embodiment of the present disclosure, can be used to verify the exemplary procedure to detect threshold of widely used DDoS tool-DDoS-Deflate. This can be one of the reasons why real-world DDoS attacks infect the victim for days without being detected. (See, e.g., Reference 54).

Exemplary Evaluation and Results

Figure 15:
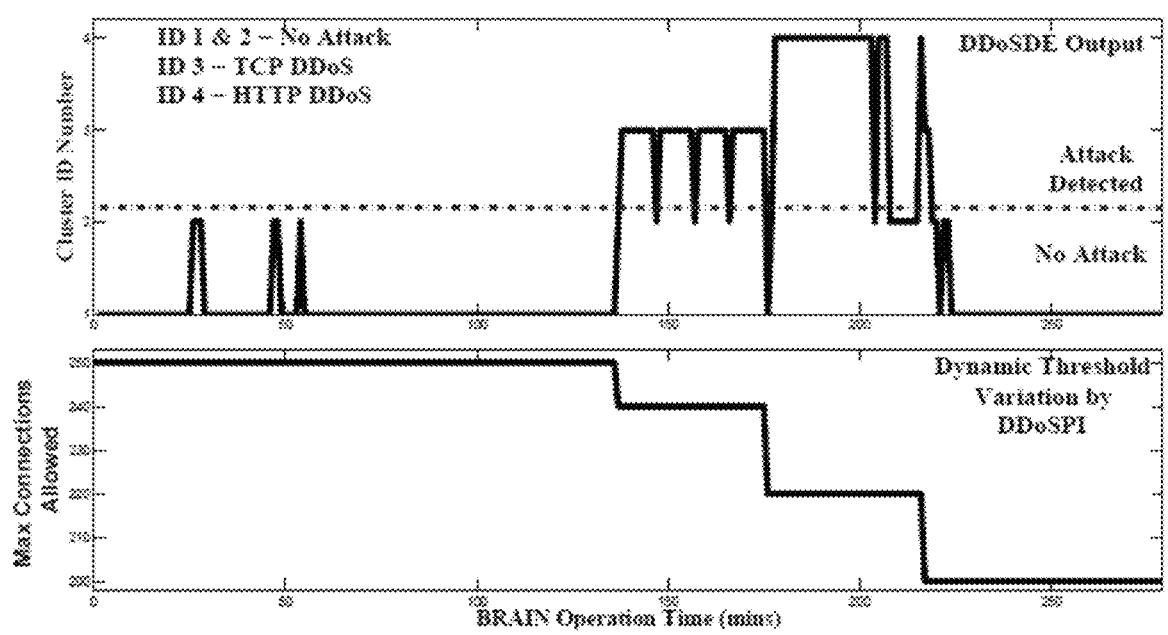
FIG. 15 is a set of exemplary graphs illustrating the online classification of attacks and dynamic threshold variation using the exemplary system, method and computer-accessible medium according to an exemplary embodiment of the present disclosure.

The exemplary experiment used multiple attack systems running DDoS attack tools such as LOIC (see, e.g., Reference 71), HOIC (see, e.g., Reference 85) and a threshold detection attack tool. The exemplary BRAIN was deployed on a Ubuntu server hosting Apache web server. The system consisted of Advanced Policy Firewall ("APF"), DDoS-Deflate. Real-world attack tools were used to launch an attack and to evaluate the exemplary BRAIN framework. Table 5 below shows the exemplary BRAIN's SVM classification results. Inclusion of hardware behavior produced significant improvement to attack classification accuracy while keeping False Alarm Rate ("FAR") to about 0%. FIG. 15 shows a graph of the exemplary BRAIN's DDoS performance and dynamic threshold variation, which prevents the attacker from learning the threshold. Combined with blacklist time scaling using RFF, the complexity of learning the threshold can increase significantly for the attacker. The exemplary BRAIN could differentiate and identify TCP and HTTP DDoS attacks. Table 7 below shows combined accuracy for TCP and HTTP attacks. SVM has higher accuracy than K-means. However, it consumes about 8-10× more resources. Thus, SVM can be called only when K-means cannot resolve the membership of a data sample. For all the exemplary cases shown in Table 6 below, the exemplary BRAIN succeeded in detecting all the attacks. DDoS-Deflate failed against the attack tool described above due to its static threshold. Apart from accuracy, FAR can play a role when machine learning procedures can be used for network security. It can signify the proportion of non-attacks classified as attacks. For real-world network services, this should to be 0. The cost of a defense system can double with 5 to 8% FAR due to the man-hours utilized to chase, verify and prove they can be false. (See, e.g., Reference 89). Even a 2% error rate can cause significant problems.

TABLE 5

BRAIN's SVM classification compared with known defense systems. The addition of hardware behavior for DDoS attack detection can yield superior results.

| Features for SVM Classification | Accuracy | False Alarm Rate |
| --- | --- | --- |
| Packet and network stats [46] | 96.9% | 28.4% |
| IP address and Hop count stats [47] | 98.99% | 1.01% |
| Application and Network stats [48] | 99.32% | Not Available |
| BRAIN | 99.8% | 0 |

TABLE 6

Experimentation Results Summary: Comparison of BRAIN with DDoS-Deflate. (DDoS-deflate detected the attacks twice but did not detect any subsequent attacks from this tool as the tool had learnt the threshold).

| Attack Toot | Attack Type | DDoS-Deflate | BRAIN |
| --- | --- | --- | --- |
| High Orbit Ion Cannon (HOIC) | HTTP-DDoS | Detected | Detected |
|  | Detected | Detected |  |
| Low Orbit Ion Cannon (LOIC) | TCP-DDoS | Detected | Detected |
|  | HTTP-DDoS | Detected | Detected |
| Our Attack Tool | TCP-DDoS | Not Detected[1] | Detected |
|  | HTTP-DDoS | Not Detected[1] | Detected |

TABLE 7

BRAIN Detection Metrics. Very few attack instances can be classified as not attacks. However, 0% non-attacks can be classified as attacks. BRAIN model building phase can be responsible for this favorable result. The performance overhead due to BRAIN running on the host was only 1%. During a DDoS attack, the resources can be depleted and it can be beneficial that the security components do not consume significant system resources. BRAINs event values can be sent for evaluation every 5 seconds and the machine learning procedures can be active for a very small duration of time (e.g., every 5 seconds). Thus, BRAINs can achieve 1% overhead, making it suitable for real-time DDoS defense system.

| Traffic Type | K-Means Accuracy | False Alarm Rate | SVM Accuracy | False Alarm Rate |
| --- | --- | --- | --- | --- |
| No Attack | 97.5% | — | 99.9% | — |
| DDoS Attacks | 97.8% | 0% | 99.8% | 0% |

Figure 17:
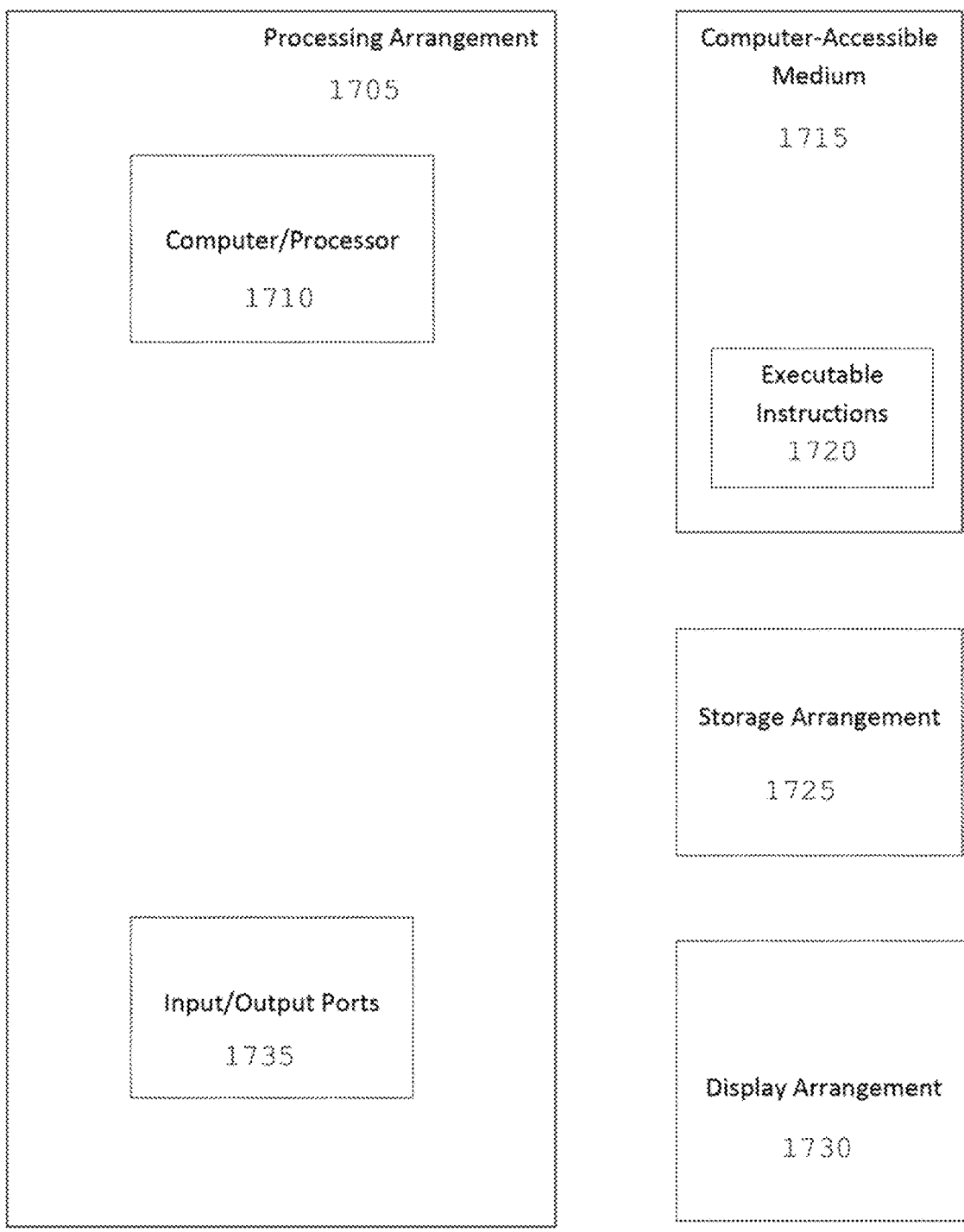
FIG. 17 is an illustration of an exemplary block diagram of an exemplary system according to an exemplary embodiment of the present disclosure.

FIG. 17 shows a block diagram of an exemplary embodiment of a system according to the present disclosure. For example, exemplary procedures in accordance with the present disclosure described herein can be performed by a processing arrangement and/or a computing arrangement 1705. Such processing/computing arrangement 1705 can be, for example entirely or a part of, or include, but not limited to, a computer/processor 1710 that can include, for example one or more microprocessors, and use instructions stored on a computer-accessible medium (e.g., RAM, ROM, hard drive, or other storage device).

As shown in FIG. 17, for example a computer-accessible medium 1715 (e.g., as described herein above, a storage device such as a hard disk, floppy disk, memory stick, CD-ROM, RAM, ROM, etc., or a collection thereof) can be provided (e.g., in communication with the processing arrangement 1705). The computer-accessible medium 1715 can contain executable instructions 1720 thereon. In addition or alternatively, a storage arrangement 1725 can be provided separately from the computer-accessible medium 1715, which can provide the instructions to the processing arrangement 1705 so as to configure the processing arrangement to execute certain exemplary procedures, processes and methods, as described herein above, for example.

Further, the exemplary processing arrangement 1705 can be provided with or include an input/output arrangement 1735, which can include, for example a wired network, a wireless network, the internet, an intranet, a data collection probe, a sensor, etc. As shown in FIG. 17, the exemplary processing arrangement 1705 can be in communication with an exemplary display arrangement 1730, which, according to certain exemplary embodiments of the present disclosure, can be a touch-screen configured for inputting information to the processing arrangement in addition to outputting information from the processing arrangement, for example. Further, the exemplary display 1730 and/or a storage arrangement 1725 can be used to display and/or store data in a user-accessible format and/or user-readable format.

APPENDIX

Exemplary Stability Analysis Results

Figure 16:
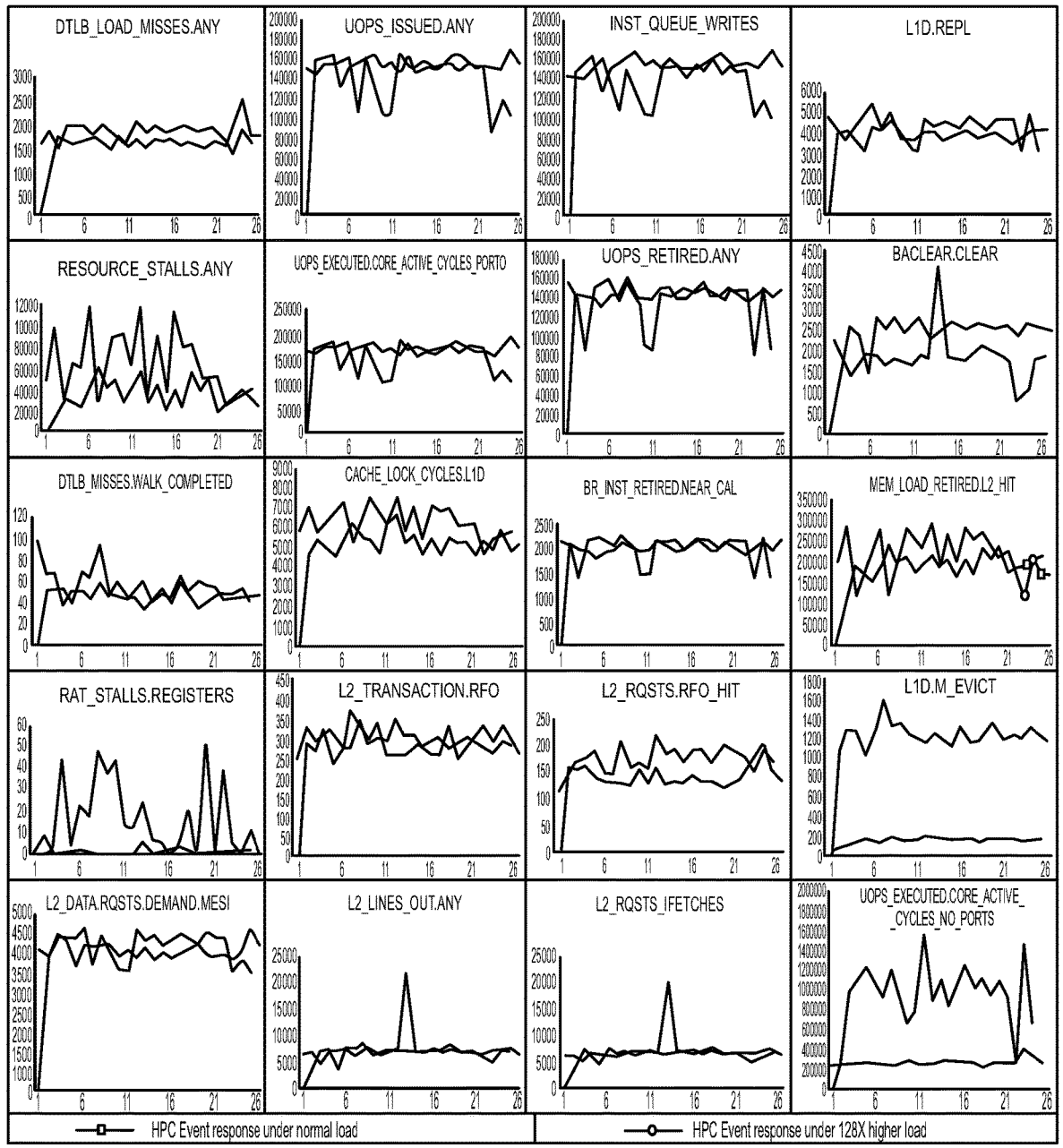
FIG. 16 is a set of exemplary graphs illustrating an exemplary HPC Events stability analysis with different loads according to an exemplary embodiment of the present disclosure.

Stability analysis results were obtained by sampling multiple times during normal load and high load. To observe the stability and sensitivity of selected hardware events, the load was increased to more than 100× using "Linux stress" tool when compared to normal load and the results are shown in the set of graphs shown in FIG. 16. For example, as shown in FIG. 16, during normal operation, the system load is 0.03, while the system load is 3.84 under higher load. Hardware events such as resources stalled, micro-operations executed and cache related operation show increase in magnitude during heavy load compared to normal operations. However, these magnitudes are not significantly higher when compared to the events magnitude during attacks.

During high load, it can be observed that events related to CPU stalls, L1-cache, L2-cache can increase in number. The number of cycles Uops executed and total resource stalls increased drastically during load. The magnitude of this event under high load can be quite minuscule when compared to the magnitude during an attack. L1-cache evicts, L2-cache requests and lines out also see few spikes in variations. However, the majority of the events can be stable or less sensitive even at an increase of 134× load.

Exemplary Support Vector Machine

SVM for classification can be formulated as follows: Let data samples be $x_i \in \mathbb{R}^n$, i=1, 2, . . . l where n can be number of features of a data sample and l can be the training samples used during model development, and class label vector $y \in \mathbb{R}^l$ where $y_i \in -1,1$ can indicate the class of each training sample. The goal can be to find the maximum-margin hyperplane to divide the data samples having $y_i=1$ and $y_i=-1$. A hyperplane can be expressed as the set of exemplary samples satisfying, for example:

$$w.x-b=0 \quad (9)$$

where w can denote the normal vector to the hyperplane and (.) can be the dot product. If the data samples used in training can be linearly separable, two hyperplanes can be selected such that they can separate the data samples, and no samples exist between the two hyperplanes. The separation between the hyperplanes can be maximized. These hyper planes can be expressed as, for example:

$$w.x-b=1 \text{ and } w.x-b=1$$

It can be preferable that data samples be prevented from falling between the margins defined by the hyperplanes, such that the constraints can be expressed as, for example:

$$w.x-b \geq 1 \text{ for } x_i \text{ of the first class}$$

$$w.x-b \leq -1 \text{ for } x_i \text{ of the second class}$$

This can be expressed as an optimization problem. Thus, for example:

$$\operatorname{argmin} \tfrac{1}{2}\|w^2\|$$

subject to, for example:

$$y_i(w.x_i-b) \geq 1 \text{ for any } i=1,2,\ldots n$$

To facilitate mislabeled data samples, and in case hyperplanes do not exist to separate $y_i=1$ and $y_i=-1$ samples, soft margin can be used (see, e.g., Reference 50) which can introduce non-negative slack variables $\xi_i$, which can measure the degree of misclassification of the sample $x_i$. The objective of minimizing $\|w\|$ with the new constraint can be expressed as, for example:

$$\operatorname*{argmin}_{w,\xi,b}\left\{\frac{1}{2}\|w^2\| + \mathbb{C}\sum_{i=1}^{n}\xi_i\right\} \quad (10)$$

$$\text{subject to: } y_i(w.x_i - b) \geq 1 - \xi_i, \xi_i \geq 0 \quad (11)$$

where $\mathbb{C}>0$ can be regularization parameter chosen using cross-validation during training. Several exemplary optimizations and transformations can be used to reduce the computational complexity to quadratic programming problem. (See, e.g., References 41 and 50). After the objective function in Eq. 10, Eq. 10 can be solved, and the hyperplane boundary or the decision function can be obtained. It can be represented as, for example:

$$\operatorname{sgn}(w^T \emptyset(x_i) - b) = \operatorname{sgn}\left(\sum_{i=1}^{l} y_i \alpha_i K(x_i, x) + b\right)$$

where $\emptyset(x_i)$ can map $x_i$ to higher dimensional space, $K(x_i, x_j) \equiv \emptyset(x_i)^T \emptyset(x_j)$ can be called the kernel function and $\alpha_1$ can be obtained by primal-dual relationship such that the optimal w satisfies, for example:

$$w = \sum_{i=1}^{l} y_i \alpha_i \emptyset(x_i)$$

Linear SVM can be used, and to perform multiclass classification, an exemplary "one-against-one" approach can be used. (See, e.g., References 41 and 51).

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

EXEMPLARY REFERENCES

The following references are hereby incorporated by reference in their entireties:

[1] Prolexic, "Q4 2013 Global DDoS Attack Trends," http://www.prolexic.com/knowledge-center-ddos-attack-report-Q4-2013-attack-quarterly-trends-infographic.html.
[2] Prolexic Attack Report, "Q2 2013 saw 1000% increases in average DDoS attack bandwidth and packet-per-second rates," http://www.prolexic.com/knowledge-center-np-2013-ddos-attack-report-q2.html.
[3] Arbor Networks, "Q2 Key Findings from ATLAS," http://www. arbornetworks.com/corporate/blog/4922-q2-key-findings-from-atlas.
[4] Ponemon Institute, "Cyber Security on the Offense: A Study of IT Security Experts," http://security.radware.com/.
[5] Windriver Whitepaper, "Accelerated Deep Packet Inspection for Network Security Applications," http://www.windriver.com/whitepapers/deep-packet-inspection/Content_Inspection_Engine_WP.pdf.
[6] K. Zhang, J. Wang, B. Hua, and X. Tang, "Building High-Performance Application Protocol Parsers on Multicore Architectures," IEEE International Conference on Parallel and Distributed Systems, pp. 188-195, 2011.
[7] P. Velan, T. Jirsík, and P. Celeda, "Design and Evaluation of HTTP Protocol Parsers for IPFIX Measurement," Advances in Communication Networking, pp. 136-147, 2013.
[8] Cavium, "5 Things You Need to Know About Deep Packet Inspection (DPI)," http://www.cavium.com/pdf-Files/CSS-DPI-White-Paper.pdf.
[9] T. AbuHmed, A. Mohaisen, and D. Nyang, "A survey on deep packet inspection for intrusion detection systems," arXiv preprint arXiv:0803.0037, 2008.
[10] F. I. Shiri, B. Shanmugam, N. B. Idris, and G. N. Samy, "A Survey on Parallel and Distributed Techniques for Improving the Performance of Signature-Based Network Intrusion Detection Systems," Australian Journal of Basic and Applied Sciences, pp. 267-273, 2013.
[11] G. Ormazabal, S. Nagpal, E. Yardeni, and H. Schulzrinne, "Secure SIP: A scalable prevention mechanism for dos attacks on sip based voip systems," Principles, systems and applications of IP telecommunications. Services and security for next generation networks, pp. 107-132, 2008.
[12] C. Meiners, E. Norige, A. X. Liu, and E. Torng, "Flowsifter: A counting automata approach to layer 7 field extraction for deep flow inspection," IEEE INFOCOM, pp. 1746-1754, 2012.
[13] M. Attig and G. Brebner, "400 gb/s programmable packet parsing on a single fpga," ACM/IEEE Symposium on Architectures for Networking and Communications Systems, pp. 12-23, 2011.
[14] C. Kozanitis, J. Huber, S. Singh, and G. Varghese, "Leaping multiple headers in a single bound: wire-speed parsing using the Kangaroo system," IEEE INFOCOM, pp. 1-9, 2010.
[15] P. Kobiersky, J. Korenek, and L. Polcák, "Packet header analysis and field extraction for multigigabit networks," IEEE Symposium on Design and Diagnostics of Electronic Circuits & Systems, pp. 96-101, 2009.
[16] V. Pus, L. Kekely, and J. Korenek, "Low-latency modular packet header parser for FPGA," ACM/IEEE Symposium on Architectures for networking and communications systems, pp. 77-78, 2012.
[17] J. Moscola, Y. H. Cho, and J. W. Lockwood, "Implementation of network application layer parser for multiple TCP/IP flows in reconfigurable devices," IEEE International Conference on Field Programmable Logic and Applications, pp. 1-4, 2006.
[18] J. Moscola, Y. H. Cho, and J. W. Lockwood, "Hardware-accelerated parser for extraction of metadata in semantic network content," IEEE Aerospace Conference, pp. 18, 2007.
[19] H. Bos and K. Huang, "Towards software-based signature detection for intrusion prevention on the network card," Recent Advances in Intrusion Detection, pp. 102-123, 2006.
[20] M. Cortes, J. R. Ensor, and J. O. Esteban, "On SIP performance," Bell Labs Technical Journal, pp. 155-172, 2004.
[21] S. Wanke, M. Scharf, S. Kiesel, and S. Wahl, "Measurement of the SIP parsing performance in the SIP express router," Dependable and Adaptable Networks and Services, pp. 103-110, 2007.
[22] E. M. Nahum, J. Tracey, and C. P. Wright, "Evaluating SIP server performance," ACM SIGMETRICS Performance Evaluation Review, pp. 349-350, 2007.
[23] J. Zou, W. Xue, Z. Liang, Y. Zhao, B. Yang, and L. Shao, "SIP parsing offload: Design and performance," IEEE Global Telecommunications Conference, pp. 2774-2779, 2007.
[24] S. Ehlert, D. Geneiatakis, and T. Magedanz, "Survey of network security systems to counter SIP-based denial-of-service attacks," Computers & Security, pp. 225-243, 2010.
[25] U. U. Rehman and A. G. Abbasi, "Security analysis of VoIP architecture for identifying SIP vulnerabilities," IEEE International Conference on Emerging Technologies, pp. 87 93, 2014.
[26] F. Yu, Z. Chen, Y. Diao, T. V. Lakshman, and R. H. Katz, "Fast and Memory-efficient Regular Expression Matching for Deep Packet Inspection," ACM/IEEE Symposium on Architecture for Networking and Communications Systems, pp. 93-102, 2006.
[27] V. Paxson, W. Estes, and J. Millaway, "Flex: the fast lexical analyzer," http://www.gnu.org/software/flex, 2012.

[28] H. Wang, S. Pu, G. Knezek, and J. C. Liu, "A Modular NFA Architecture for Regular Expression Matching," ACM/SIGDA International Symposium on Field Programmable Gate Arrays, pp. 209-218, 2010.

[29] L. Yang, R. Karim, V. Ganapathy, and R. Smith, "Improving NFA-based signature matching using ordered binary decision diagrams," Recent Advances in Intrusion Detection, pp. 58-78, 2010.

[30] SNORT, "SNORT Preprocessor," http://manual.snort.org/node17.html.

[31] IETF, "RFC 3261—SIP: Session Initiation Protocol," https://www.ietf.org/rfc/rfc3261.txt.

[32] IETF, "RFC 2616—HTTP: Hypertext Transfer Protocol," https://www.ietf.org/rfc/rfc2616.txt.

[33] S. Hollenbeck, M. Rose, and L. Masinter, "Guidelines for the use of extensible markup language (XML) within IETF Protocols," RFC3470, 2003.

[34] R. Cover, "FIXML-A Markup Language for the FIX Application Message Layer," The XML Cover Pages, 1999.

[35] S. Johnson and D. Rhodes, "FMFIXML Implementation," 2001.

[36] IETF, "RFC 2543—SIP: Session Initiation Protocol," https://www.ietf.org/rfc/rfc2543.txt.

[37] George Khalil, "Open Source IDS High Performance Shootout," http://www.sans.org/reading-room/whitepapers/intrusion/open-sourceids-high-performance-shootout-35772.

[38] PJSIP—Open Source multimedia communication library, "PJSIP," http://www.pjsip.org/.

[39] T. Stefanec and I. Skuliber, "Grammar-based SIP parser implementation with performance optimizations," IEEE International Conference on Telecommunications, pp. 81-86, 2011.

[40] SIPp—Open Source test tool, "SIPp," http://sipp.sourceforge.net/.

[41] United States Computer Emergency Readiness Team (US-CERT), "Understanding Denial-of-Service Attacks," https://www.us-cert.gov/ncas/tips/ST04-015.

[42] Arbor Networks, "ATLAS Threat report," http://www.arbornetworks.com/threats/.

[43] Verisign, "Distributed Denial of Service: Finally Getting the Attention it Deserves," https://www.verisigninc.com/en US/forms/ddosattentionreport.xhtml.

[44] Computer Weekly, "DDoS attacks starting to resemble APTs, warns Imperva," http://www.computerweekly.com/news/4500247883/DDoS-attacks-starting-to-resemble-APTs-warns-Imperva.

[45] Information Week—Dark Reading, "From GitHub to Great Cannon: A Mid-Year Analysis Of DDoS Attacks," http://www.darkreading.com/attacks-breaches/from-github-to-great-cannon-a-mid-year-analysis-of-ddos-attacks/a/d-id/1320818.

[46] CISCO, "Cisco 2014 Annual Security Report," http://www.cisco.com/web/offer/gist ty2 asset/Cisco 2014 ASR.pdf.

[47] Krebs on Security, "DDoS Attack on Bank Hid $900,000 Cyberheist," http://krebsonsecurity.com/2013/02/ddos-attack-on-bank-hid-900000-cyberheist/.

[48] M. Roesch et al., "Snort: Lightweight Intrusion Detection for Networks," LISA SAC, pp. 229-238, 1999.

[49] "DDoS-Deflate," http://deflate.medialayer.com/.

[50] Galu, Vlad, "PacketDam—a cost-effective software solution against DDoS," http://www.packetdam.com/.

[51] J. Kneschke, "Lighttpd," http://www.lighttpd.net/.

[52] M. Engine, "Netflow analyzer," https://www.manageengine.com/products/netflow/.

[53] R-fx Networks, "Advanced Policy Firewall," https://www.rfxn.com/projects/advanced-policy-firewall/.

[54] Imperva, "Q2 2015 Global DDoS Threat Landscape: Assaults Resemble Advanced Persistent Threats," https://www.incapsula.com/blog/ddosglobal-threat-landscape-report-q2-2015.html.

[55] M. H. Bhuyan, H. J. Kashyap, D. K. Bhattacharyya, and J. K. Kalita, "Detecting distributed denial of service attacks: Methods, tools and future directions," The Computer Journal, p. bxt031, 2013.

[56] S. T. Zargar, J. Joshi, and D. Tipper, "A survey of defense mechanisms against distributed denial of service (ddos) flooding attacks," IEEE COMMUN SURV TUT, pp. 2046-2069, 2013.

[57] M. Geva, A. Herzberg, and Y. Gev, "Bandwidth distributed denial of service: attacks and defenses," IEEE S & P, pp. 54-61, 2014.

[58] T. M. Gil and M. Poletto, "Multops: a data-structure for bandwidth attack detection," USENIX Security, 2001.

[59] A. Jantan, T.-C. Wan et al., "Real-time detection of intrusive traffic in QoS network domains," IEEE S & P, pp. 45-53, 2013.

[60] M. Walfish, M. Vutukuru, H. Balakrishnan, D. Karger, and S. Shenker, "Ddos defense by offense," ACM SIGCOMM CCR, pp. 303-314, 2006.

[61] H.-I. Liu and K.-C. Chang, "Defending systems against tilt ddos attacks," IEEE TSSA, pp. 22-27, 2011.

[62] X. Tan and H. Xi, "Hidden semi-markov model for anomaly detection," IJAMC, pp. 562-567, 2008.

[63] Y. Xie and S.-Z. Yu, "A large-scale hidden semi-markov model for anomaly detection on user browsing behaviors," IEEE/ACM TON, pp. 54-65, 2009.

[64] J. Mirkovic and P. Reiher, "A taxonomy of DDoS attack and DDoS defense mechanisms," ACM SIGCOMM CCR, pp. 39-53, 2004.

[65] S. Ranjan, R. Swaminathan, M. Uysal, and E. W. Knightly, "DDoSResilient Scheduling to Counter Application Layer Attacks Under Imperfect Detection," IEEE INFOCOMM, pp. 1-13, 2006.

[66] M. Shtern, R. Sandel, M. Litoiu, C. Bachalo, and V. Theodorou, "Towards mitigation of low and slow application DDoS attacks," IEEE IC2E, pp. 604-609, 2014.

[67] C. Estan and G. Varghese, New directions in traffic measurement and accounting. ACM, 2002.

[68] Suricata, "Open Information Security Foundation," http://suricata-ids.org/.

[69] V. Paxson, "Bro: a System for Detecting Network Intruders in Real-Time," Computer Networks, pp. 2435-2463, 1999.

[70] V. Jyothi, S. K. Addepalli, and R. Karri, "Deep Packet Field Extraction Engine DPFEE A Pre-processor for Network Intrusion Detection and Denial-of-Service Detection Systems," IEEE ICCD, pp. 287-293, 2015.

[71] SpiderLabs, "LOIC DDoS Analysis and Detection," http://blog.spiderlabs.com/2011/01/loic-ddos-analysis-and-detection.html.

[72] J. Du, N. Sehrawat, and W. Zwaenepoel, "Performance profiling of virtual machines," ACM SIGPLAN/SIGOPS VEE, pp. 3-14, 2011.

[73] J. Rao and C.-Z. Xu, "Online measurement of the capacity of multi-tier websites using hardware performance counters," IEEE ICDCS, pp. 705-712, 2008.

[74] D. Economou, S. Rivoire, C. Kozyrakis, and P. Ranganathan, "Full-system power analysis and modeling for server environments," pp. 1-7, 2006.

[75] A. W. Lewis, S. Ghosh, and N.-F. Tzeng, "Run-time Energy Consumption Estimation Based on Workload in Server Systems," HotPower, pp. 17-21, 2008.

[76] X. Wang and R. Karri, "Numchecker: Detecting kernel control-flow modifying rootkits by using hardware performance counters," IEEE DAC, pp. 1-7, 2013.

[77] M. Schmidt, L. Baumg¨artner, P. Graubner, D. B¨ock, and B. Freisleben, "Malware detection and kernel rootkit prevention in cloud computing environments," IEEE PDP, pp. 603-610, 2011.

[78] F. Pedregosa and et al., "Scikit-learn: Machine Learning in Python," JMLR, pp. 2825-2830, 2011.

[79] Wikipedia, "Random Forests," https://en.wikipedia.org/wiki/Random forest.

[80] P. Guide, "Intel (R) 64 and is-32 architectures software developer's manual," 2010.

[81] C.-C. Chang and C.-J. Lin, "LIBSVM: A Library for Support Vector Machines," ACM TIST, pp. 1-27, 2011.

[82] S. R. Gaddam, V. V. Phoha, and K. S. Balagani, "K-means+id3: A novel method for supervised anomaly detection by cascading k-means clustering and id3 decision tree learning methods," IEEE TKDE, pp. 345-354, 2007.

[83] Z. Muda, W. Yassin, M. Sulaiman, and N. I. Udzir, "A K-Means and Naive Bayes learning approach for better intrusion detection," JIT, pp. 648-655, 2011.

[84] M. Gao and N. Wang, "A Network Intrusion Detection Method Based on Improved K-means Procedure," ASTL, pp. 429-433, 2014.

[85] SpiderLabs, "HOIC DDoS Analysis and Detection," http://blog. spiderlabs.com/2012/01/hoic-ddos-analysis-and-detection.html.

[86] K. Kato and V. Klyuev, "An Intelligent DDoS Attack Detection System Using Packet Analysis and Support Vector Machine," IJICR, pp. 478-485, 2014.

[87] K. Devi, G. Preetha, G. Selvaram, and S. M. Shalinie, "An impact analysis: Real time DDoS attack detection and mitigation using machine learning," ICRTIT, pp. 1-7, 2014.

[88] A. Ramamoorthi, T. Subbulakshmi, and S. M. Shalinie, "Real time detection and classification of ddos attacks using enhanced svm with string kernels," ICRTIT, pp. 91-96, 2011.

[89] Beyond Security, "Vulnerability Assessment Accuracy," http://www. beyondsecurity.com/va accuracy false positive negative.html.

[90] C. Cortes and V. Vapnik, "Support-vector networks," Machine Learning, pp. 273-297, 1995.

[91] S. Knerr, L. Personnaz, and G. Dreyfus, "Single-layer learning revisited: a procedurewise procedure for building and training a neural network," Neurocomputing, pp. 41-50, 1990.

What is claimed is:

1. A non-transitory computer-accessible medium having stored thereon computer-executable instructions for detecting at least one intrusion in at least one network, wherein, when a computer arrangement executes the instructions, the computer arrangement is configured to perform procedures comprising:

receiving a plurality of Hardware Performance Counter ("HPC") values for at least one event, wherein the HPC values include counts of hardware-related activities;

receiving a plurality of network statistics for the at least one network, wherein the network statistics are based on the HPC values, and wherein the network statistics include a number of concurrent active connections and a number of unique users which affect the HPC values;

assembling the HPC values and the network statistics into at least one feature vector;

clustering the HPC values and the network statistics of the at least one feature vector; and detecting the at least one intrusion in the at least one network by determining a presence of at least one anomaly based on the clustered HPC values and the clustered network statistics.

2. The computer-accessible medium of claim 1, wherein the computer arrangement is configured to detect the at least one intrusion in the at least one network by correlating the network statistics with the HPC values.

3. The computer-accessible medium of claim 1, wherein the clustering includes a k-means clustering.

4. The computer-accessible medium of claim 3, wherein the k-means clustering includes an unsupervised k-means clustering.

5. The computer-accessible medium of claim 1, wherein the computer arrangement is configured to cluster the at least one feature vector using at least one of a learning clustering procedure or an online clustering procedure.

6. The computer-accessible medium of claim 5, wherein the learning clustering procedure includes a continuous learning.

7. The computer-accessible medium of claim 5, wherein the computer arrangement is configured to determine at least one centroid value of at least one cluster in the at least one feature vector using the learning clustering procedure.

8. The computer-accessible medium of claim 5, wherein the online clustering procedure excludes learning clustering.

9. The computer-accessible medium of claim 5, wherein the computer arrangement is configured to determine cluster membership in the at least one feature vector using the online clustering procedure.

10. The computer-accessible medium of claim 1, wherein the computer arrangement is configured to determine the presence of the at least one anomaly using a support vector machine.

11. The computer-accessible medium of claim 1, wherein the computer arrangement is further configured to deny access, by at least one internet protocol (IP) address to the at least one network, based on the detection of the at least one intrusion.

12. The computer-accessible medium of claim 11, wherein the computer-arrangement is further configured to grant access to the at least one IP address after a predetermined amount of time has passed since the detection of the at least one intrusion.

13. A system for detecting at least one intrusion in at least one network, comprising:

a specifically configured computer hardware arrangement configured to:

receive a plurality of Hardware Performance Counter ("HPC") values for at least one event, wherein the HPC values include counts of hardware-related activities;

receive a plurality of network statistics for the at least one network, wherein the network statistics are based on the HPC values and wherein the network statistics include a number of concurrent active connections and a number of unique users which affect the HPC values;

assemble the HPC values and the network statistics into at least one feature vector;

cluster the HPC values and the network statistics of the at least one feature vector; and detect the at least one intrusion in the at least one network by determining a presence of at least one anomaly based on the clustered HPC values and the clustered network statistics.

14. A method for detecting at least one intrusion in at least one network, comprising:

receiving a plurality of Hardware Performance Counter ("HPC") values for at least one event, wherein the HPC values include counts of hardware-related activities;

receiving a plurality of network statistics for the at least one network, wherein the network statistics are based on the HPC values and wherein the network statistics include a number of concurrent active connections and a number of unique users which affect the HPC values;

assembling the HPC values and the network statistics into at least one feature vector;

clustering the HPC values and the network statistics of the at least one feature vector; and using a specifically configured computer hardware arrangement, detecting the at least one intrusion in the at least one network by determining a presence of at least one anomaly based on the clustered HPC values and the clustered network statistics.

* * * * *